United States Patent
Shulyak et al.

(10) Patent No.: US 12,045,170 B2
(45) Date of Patent: Jul. 23, 2024

(54) REPLACEMENT CONTROL FOR CANDIDATE PRODUCER-CONSUMER RELATIONSHIPS TRAINED FOR PREFETCH GENERATION

(71) Applicant: Arm Limited, Cambridge (GB)

(72) Inventors: Alexander Cole Shulyak, Austin, TX (US); Karthik Sundaram, Austin, TX (US)

(73) Assignee: Arm Limited, Cambridge (GB)

( * ) Notice: Subject to any disclaimer, the term of this patent is extended or adjusted under 35 U.S.C. 154(b) by 160 days.

(21) Appl. No.: 17/545,121

(22) Filed: Dec. 8, 2021

(65) Prior Publication Data

US 2023/0176973 A1    Jun. 8, 2023

(51) Int. Cl.
G06F 12/08        (2016.01)
G06F 12/0862    (2016.01)
G06N 20/00        (2019.01)

(52) U.S. Cl.
CPC ......... G06F 12/0862 (2013.01); G06N 20/00 (2019.01); *G06F 2212/602* (2013.01)

(58) Field of Classification Search
CPC .......... G06F 12/0862; G06F 2212/602; G06N 20/00
USPC ....................................................... 711/118
See application file for complete search history.

(56) References Cited

U.S. PATENT DOCUMENTS

| | | |
|---|---|---|
| 6,275,918 B1 | 8/2001 | Burky |
| 6,721,870 B1 | 4/2004 | Yochai |
| 8,196,147 B1 | 6/2012 | Srinivasan et al. |
| 2006/0026408 A1 | 2/2006 | Morris |
| 2007/0088919 A1 | 4/2007 | Shen |
| 2007/0101066 A1* | 5/2007 | Al Sukhni .......... G06F 12/0862 711/137 |

(Continued)

OTHER PUBLICATIONS

U.S. Appl. No. 17/093,792, filed Nov. 10, 2020, Shulyak et al.

(Continued)

*Primary Examiner* — Gautam Sain
(74) *Attorney, Agent, or Firm* — NIXON & VANDERHYE P.C.

(57) ABSTRACT

Prefetch generation circuitry generates requests to prefetch data to a cache, where the prefetch generation circuitry is configured to initiate a producer prefetch to request return of producer data having a producer address and to initiate at least one consumer prefetch to request prefetching of consumer data to the cache, the consumer data having an address derived from the producer data returned in response to the producer prefetch. Training circuitry updates, based on executed load operations, a training table indicating candidate producer-consumer relationships being trained for use by the prefetch generation circuitry in generating the producer/consumer prefetches. Replacement control circuitry controls replacement of candidate producer-consumer relationships based on a producer-data-consumer-operand (PD-CO) match-based replacement policy criterion, which depends on whether a PD-CO match condition, indicative of the producer data for a producer load matching an address operand of a consumer load, is satisfied for existing/new candidate producer-consumer relationships.

19 Claims, 15 Drawing Sheets

(56) References Cited

U.S. PATENT DOCUMENTS

| | | | |
|---|---|---|---|
| 2010/0042776 A1* | 2/2010 | Seo | G06F 12/123 |
| | | | 711/E12.008 |
| 2010/0241813 A1 | 9/2010 | Shen | |
| 2017/0168946 A1 | 6/2017 | Wang | |
| 2017/0286119 A1* | 10/2017 | Al Sheikh | G06F 9/3848 |
| 2017/0344483 A1 | 11/2017 | Shwartsman et al. | |
| 2017/0371790 A1* | 12/2017 | Dwiel | G06F 12/0862 |
| 2020/0387381 A1 | 12/2020 | Karve | |
| 2021/0089312 A1* | 3/2021 | Kothinti Naresh | |
| | | | G06F 9/30145 |
| 2023/0057633 A1* | 2/2023 | Nguyen | G06F 13/1689 |

OTHER PUBLICATIONS

U.S. Appl. No. 17/579,842, filed Jan. 20, 2022, Shulyak et al.

A. Roth et al., "Dependence Based Prefetching for Linked Data Structures," Oct. 1998, pp. 115-126.

X. Yu et al., "IMP: Indirect Memory Prefetcher", Proceedings of the 48$^{th}$ International Symposium on Microarchitecture—Micro 48, Dec. 5-9, 2015, 14 pages.

Notice of Allowance dated May 31, 2023 for U.S. Appl. No. 17/579,842, 14 pages.

Notice of Allowance dated May 12, 2022 for U.S. Appl. No. 17/093,792, 15 pages.

\* cited by examiner

REPLACEMENT CONTROL FOR CANDIDATE PRODUCER-CONSUMER RELATIONSHIPS TRAINED FOR PREFETCH GENERATION

BACKGROUND

Technical Field

The present technique relates to the field of prefetching.

Technical Background

Prefetching is a technique used by a data processing apparatus to mitigate against the latency associated with memory access, by initiating the retrieval of data values or instructions from memory before the data processing apparatus encounters the corresponding instructions to fetch those data values or instructions. In some cases prefetching is more straightforward, for example when an address from which a data value is to be loaded is directly specified in a corresponding instruction, since this will generally result in a more regular pattern of accesses, because each time this instruction is encountered the load comes from the same address. However prefetching becomes more difficult when a load instruction is a "consumer load", where the address from which a data value is to be loaded is indirectly specified, being based on a data value returned in an earlier "producer load". Variability in that data value thus results in variability in the address which the consumer load accesses and thus a more variability in the pattern of accesses. Accordingly, such producer-consumer load relationships can result in an irregular and non-repeating access pattern, making it more difficult to identify and schedule prefetches.

SUMMARY

At least some examples of the present technique provide an apparatus comprising: prefetch generation circuitry to generate requests to prefetch data to a cache, where the prefetch generation circuitry is configured to initiate a producer prefetch to request return of producer data having a producer address and to initiate at least one consumer prefetch to request prefetching of consumer data to the cache, the consumer data having an address derived from the producer data returned in response to the producer prefetch;
training circuitry to update, based on executed load operations, a training table indicative of a plurality of candidate producer-consumer relationships being trained for use by the prefetch generation circuitry in generating the producer prefetch and the consumer prefetch;
match determining circuitry to determine, for a given candidate producer-consumer relationship between a given producer load and a given consumer load, whether the given candidate producer-consumer relationship satisfies a producer-data-consumer-operand (PD-CO) match condition indicative of the producer data of the given producer load matching an address operand of the given consumer load; and
replacement control circuitry to control, based on at least one replacement policy criterion, replacement of an existing candidate producer-consumer relationship indicated in the training table with a new candidate producer-consumer relationship; in which:
said at least one replacement policy criterion includes a PD-CO-match-based replacement policy criterion depending on whether the PD-CO match condition is satisfied for at least one of: the new candidate producer-consumer relationship, and one or more existing candidate producer-consumer relationships capable of being replaced with the new candidate producer-consumer relationship.

At least some examples of the present technique provide a method comprising:
updating, based on executed load operations, a training table indicative of a plurality of candidate producer-consumer relationships being trained for use in generating a producer prefetch to request return of producer data and a consumer prefetch to request prefetching of consumer data to a cache, the consumer data having an address derived from the producer data;
determining, for a given candidate producer-consumer relationship between a given producer load and a given consumer load, whether the given candidate producer-consumer relationship satisfies a producer-data-consumer-operand (PD-CO) match condition indicative of the producer data of the given producer load matching an address operand of the given consumer load; and
controlling, based on at least one replacement policy criterion, replacement of an existing candidate producer-consumer relationship indicated in the training table with a new candidate producer-consumer relationship; in which:
said at least one replacement policy criterion includes a PD-CO-match-based replacement policy criterion depending on whether the PD-CO match condition is satisfied for at least one of: the new candidate producer-consumer relationship, and one or more existing candidate producer-consumer relationships capable of being replaced with the new candidate producer-consumer relationship.

At least some examples of the present technique provide a non-transitory computer-readable medium to store computer-readable code for fabrication of an apparatus comprising:
prefetch generation circuitry to generate requests to prefetch data to a cache, where the prefetch generation circuitry is configured to initiate a producer prefetch to request return of producer data having a producer address and to initiate at least one consumer prefetch to request prefetching of consumer data to the cache, the consumer data having an address derived from the producer data returned in response to the producer prefetch;
training circuitry to update, based on executed load operations, a training table indicative of a plurality of candidate producer-consumer relationships being trained for use by the prefetch generation circuitry in generating the producer prefetch and the consumer prefetch;
match determining circuitry to determine, for a given candidate producer-consumer relationship between a given producer load and a given consumer load, whether the given candidate producer-consumer relationship satisfies a producer-data-consumer-operand (PD-CO) match condition indicative of the producer data of the given producer load matching an address operand of the given consumer load; and
replacement control circuitry to control, based on at least one replacement policy criterion, replacement of an existing candidate producer-consumer relationship indicated in the training table with a new candidate producer-consumer relationship; in which:
said at least one replacement policy criterion includes a PD-CO-match-based replacement policy criterion depending on whether the PD-CO match condition is satisfied for at least one of: the new candidate producer-consumer relationship, and one or more existing candidate producer-consumer relationships capable of being replaced with the new candidate producer-consumer relationship.

Further aspects, features and advantages of the present technique will be apparent from the following description of examples, which is to be read in conjunction with the accompanying drawings.

DESCRIPTION OF EXAMPLES

Figure 1:
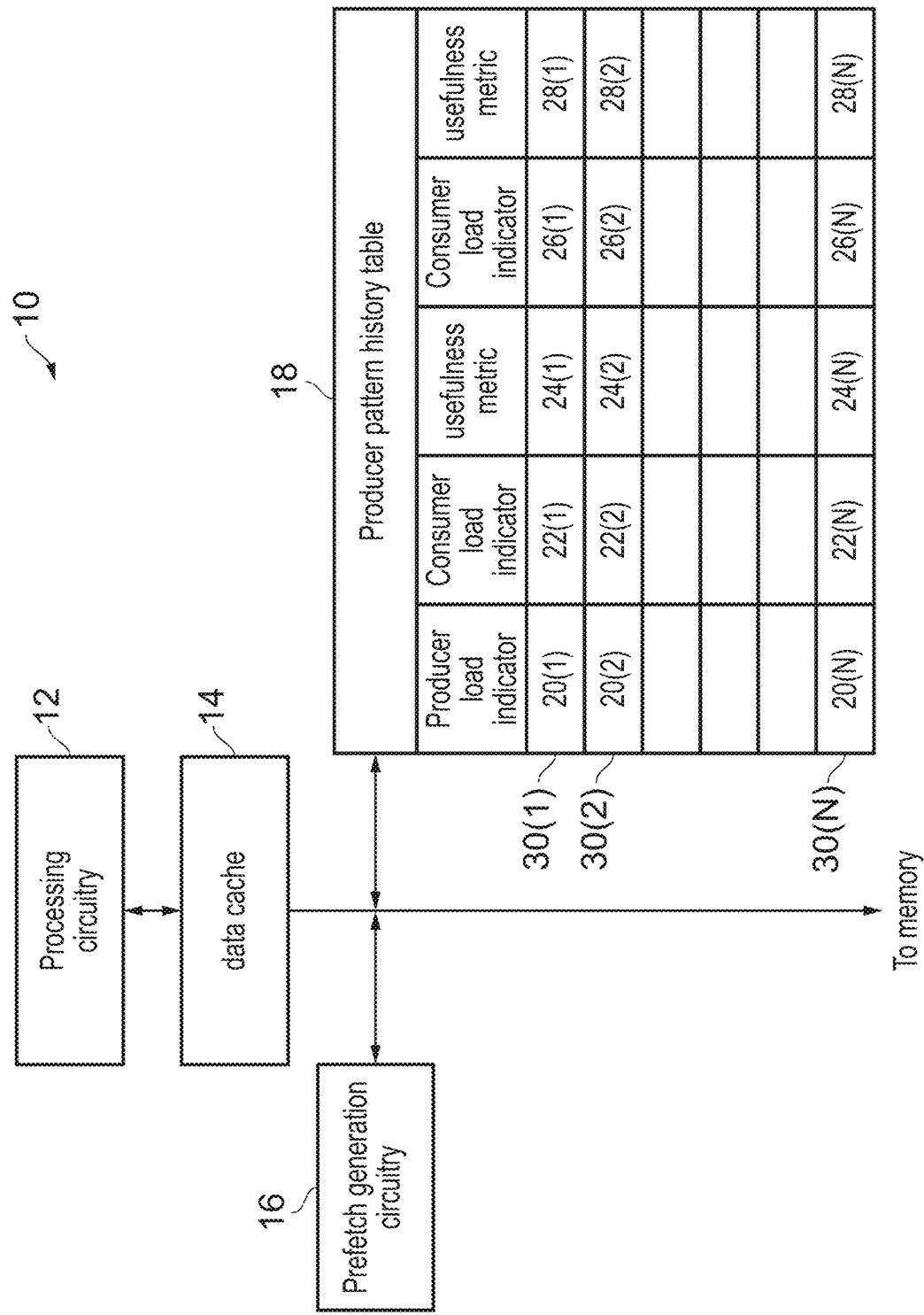
FIG. 1 schematically illustrates details of a data processing apparatus.

Control of Replacement Policy for Candidate Producer-Consumer Relationships Trained for Prefetch Generation A processing apparatus may have prefetch generation circuitry to generate requests to prefetch data to a cache. The indirect prefetch circuitry can initiate a producer prefetch to request return of producer data having a producer address and initiate at least one consumer prefetch to request prefetching of consumer data to the cache, where the consumer data has a consumer address derived from the producer data returned in response to the producer prefetch. This can be useful for improving cache hit rates when processing program code which uses a pointer loaded by a producer load to form addresses for one or more consumer loads. Training circuitry can be used to learn the producer-consumer relationships used to generate the producer/consumer prefetches. The training circuitry updates, based on executed load operations, a training table indicative of a plurality of candidate producer-consumer relationships being trained for use by the prefetch generation circuitry in generating the producer prefetch and the consumer prefetch.

However, some processing workloads may, due to the way that objects are sequentially allocated in memory, include loads that appear to have a dependency on the data loaded by an earlier load is compared with the address of a later load, but are actually not related as the later load's address may be completely independent of the producer data of the earlier load. For example, this may arise if the address of the later load is within a relatively small offset of the data loaded by the earlier load. Such loads may be detected by the training circuitry as having a producer-consumer relationship. As the training circuitry may have capacity in the training table for learning a limited number of producer-consumer relationships, the relationship between the loads having the "false" producer-consumer relationship may cause eviction from the training table of other producer-consumer relationships relating to loads having a true dependency which could have been more useful to retain, as for the loads with the true dependency then even if memory is reallocated to change the relative position in the address space of different objects, the dependency will be retained and so the producer-consumer relationship can still be useful for predicting addresses of prefetch requests, which would not be the case for the loads having the "false" producer-consumer relationship where the apparent producer-consumer relationship may merely be an artefact of the particular way in which memory has been allocated at a particular time, and may not survive once memory is reallocated.

The inventors have recognised that it is more likely that a given producer load and a given consumer load will have a true dependency when the producer data of the given producer load matches an address operand of the given consumer load. Hence, match determining circuitry can be provided to determine, for a given candidate producer-consumer relationship between a given producer load and a given consumer load, whether the given candidate producer-consumer relationship satisfies a producer-data-consumer-operand (PD-CO) match condition indicative of the producer data of the given producer load matching an address operand of the given consumer load. One might expect that, using the match determining circuitry, the candidate producer-consumer relationships which relate to loads not satisfying the PD-CO match condition could then be prevented from being allocated to the training table at all, to filter out the false relationships. However, the inventors also recognised that sometimes loads which do have a true dependency (e.g. a pointer relationship) nevertheless do not have an address operand of the consumer load matching the producer data of the producer load, due to at least one intervening arithmetic/logical operation being performed on the producer data to generate the address operand of the consumer load. Therefore, it would be undesirable to filter out altogether the candidate producer-consumer relationships which do not satisfy the PD-CO match condition.

Instead, while candidate producer-consumer relationships not satisfying the PD-CO match condition can still be allocated to the training table by the training circuitry, replacement policy for controlling replacement of an existing candidate producer-consumer relationship with a new candidate producer-consumer relationship is controlled by replacement control circuitry based on at least one replacement policy criterion which includes at least a PD-CO-match-based replacement policy criterion depending on whether the PD-CO match condition is satisfied for at least one of: the new candidate producer-consumer relationship, and one or more existing candidate producer-consumer relationships capable of being replaced with the new candidate producer-consumer relationship.

By factoring in, when deciding whether to replace an entry with a new one or selecting which entry to replace, whether the PD-CO match condition is satisfied for the new candidate producer-consumer relationship to be allocated to the table and/or one or more existing candidate producer-consumer relationships already in the table which are capable of being replaced with the new relationship, this can allow the replacement control circuitry to bias replacement policy so that it is more likely that candidate producer-consumer relationships satisfying the PD-CO match condition are retained in the training table. This increases the likelihood that the limited training resource is used for candidate producer-consumer relationships with true dependencies which are more likely to continue to provide useful prefetch predictions even after memory is reallocated to rearrange objects in memory address space. Hence, this can improve prefetch coverage (the fraction of prefetch requests which help to avoid a cache miss), and therefore reduce cache miss rates and improve processing performance.

In the PD-CO-match-based replacement policy criterion, the replacement control circuitry may favour a new candidate producer-consumer relationship which satisfies the PD-CO match condition in preference to an existing candidate producer-consumer relationship which fails to satisfy the PD-CO match condition. This helps to prioritise the true dependencies over the false dependencies, to make more efficient use of limited training resources.

The PD-CO-match-based replacement policy criterion may not be the only criterion being applied by the replacement control circuitry for controlling replacement of candidate producer-consumer relationships. The replacement control circuitry may control the replacement based on a hierarchy of replacement policy criteria, with a higher-priority replacement policy criterion taking preference over a lower-priority replacement policy criterion. The relative priority of the various replacement policy criteria may be such that the replacement control circuitry selects for replacement an existing candidate producer-consumer relationship that satisfies the higher-priority replacement policy criterion in preference to an existing candidate producer-consumer relationship that satisfies the lower-priority replacement policy criterion.

The PD-CO-match-based replacement policy criterion could be implemented at different levels of the hierarchy. In some examples, it can be useful for the PD-CO-match-based replacement policy criterion to be a replacement policy criterion other than a highest-priority replacement policy criterion in the hierarchy. Hence, there may be at least one other criterion which takes precedence over the PD-CO-match-based replacement policy criterion.

For example, the highest-priority replacement policy criterion can be a usefulness-based replacement policy criterion depending on a level of usefulness associated with the one or more existing candidate producer-consumer relationships. The level of usefulness may be an indication of how likely it is that the candidate producer-consumer relationship will be able to be used for a successful prefetch which enables cache miss rate to be reduced. The level of usefulness may be expressed by usefulness metric which can depend on one or more usefulness parameters. For example, one usefulness parameter can be a confidence parameter which expresses a level of confidence in the prediction of the consumer address. This can be based on observation of previous instances of encountering the consumer load after the producer load, with the confidence being increased if the consumer address seen for a particular consumer load (at a particular program counter address) has the same relationship with the producer data as seen previously. The training circuitry may also implement an aging mechanism where confidence levels of existing entries are decreased over time to allow stale entries (e.g. entries for which the corresponding producer or consumer load is not encountered again) to be removed, freeing up space for predictions relating to other producer/consumer pairs. Another example of a usefulness parameter can be a timeliness parameter which expresses how likely it is that the consumer prefetch can be issued to the cache in time for the consumer data to be returned and allocated into the cache before the processing circuitry requests that data using a demand load request. For example, even if the consumer address can be correctly predicted using the candidate producer-consumer relationship, some time may be needed to process the producer prefetch, return the producer data to the prefetch generation circuitry, generate and process the corresponding consumer prefetch, and allocate the consumer data into the cache, and so in practice if the demand load stream includes the corresponding producer and consumer loads quickly after one another than the consumer prefetch may, even if correctly predicted, not be useful because it may not serve to significantly reduce the cache miss rate seen by the stream of demand loads. Hence, the level of usefulness may depend on one or more of the confidence parameter and the timeliness parameter.

Performance may be greater if the usefulness-based replacement policy criterion is treated as higher priority than the PD-CO-match-based replacement policy criterion, because it may be more useful to evict a "useless" candidate producer-consumer relationship (having less than a threshold level of usefulness) which satisfies the PD-CO match condition in preference to a "useful" candidate producer-consumer relationship (having the threshold level of usefulness or greater) which does not satisfy the PD-CO match condition. However, by applying the PD-CO match condition as a replacement policy criterion at a lower level of the hierarchy, then if there are no "useless" candidate producer-consumer relationships available for eviction, then the PD-CO match condition can help to bias the occupancy of the training table towards retaining producer/consumer relationships having a true dependent relationship which are more likely to be useful in the long term. This helps to improve prefetch coverage, increasing average cache hit rates and hence improves performance.

Hence, in one example the replacement control circuitry is configured to allow the new candidate producer-consumer relationship to replace one of said one or more existing candidate producer-consumer relationships having less than a threshold level of usefulness, and when none of said one or more existing candidate producer-consumer relationships has less than the threshold level of usefulness and the new candidate producer-consumer relationship satisfies the PD-CO match condition, allow the new candidate producer-consumer relationship to replace one of said one or more existing candidate producer-consumer relationships which fails to satisfy the PD-CO match condition.

In one example, the PD-CO-match-based replacement policy criterion is a second-highest-priority replacement policy criterion in the hierarchy. This has been found to improve performance relative to the PD-CO-match-based replacement policy being at a lower level of the hierarchy.

The hierarchy of replacement policy criteria can also include other types of replacement policy criterion. For example, the hierarchy of replacement policy criteria can include a self-producer-based criterion depending on whether a self-producer condition is satisfied for at least one of: the new candidate producer-consumer relationship, and the one or more existing candidate producer-consumer relationships. The self-producer condition is satisfied for the given candidate producer-consumer relationship when the given consumer load is itself a producer load for another producer-consumer relationship (e.g. another candidate producer-consumer relationship in the training table, or a producer-consumer relationship in a pattern history table which, as described further below, may store producer-consumer relationships promoted from the training table once fully trained, with the pattern history table being referenced by the prefetch generation circuitry for generating the prefetch requests). The prefetch generation circuitry may support a recursive chain of dependent producers/consumers where each consumer prefetch may itself be compared against indications of producer prefetches represented by other producer-consumer relationships, so that if there is a match then a further set of consumers can be generated with addresses derived from the data obtained by the consumer prefetch from an earlier level in the chain. This can be useful for improving performance of workloads which use a linked list comprising a number of nodes where each node provides a pointer to the next node. Hence, it can be useful to bias replacement policy so that producer-consumer relationships which specify a consumer which itself acts as a producer in another producer-consumer relationship are more likely to be retained, because this will tend to increase the number of useful prefetches that can be generated, hence increasing prefetch coverage. Hence, the self-producer-based criterion may prioritise retention of candidate producer-consumer relationships which satisfy the self-producer condition (i.e. relationships for which the consumer load is itself a producer load for another producer-consumer relationship) over candidate producer-consumer relationships which do not satisfy the self-producer condition.

In one example, the self-producer-based criterion has a lower priority in the hierarchy than the PD-CO-match-based replacement policy criterion. This has been found to improve performance compared to prioritising the self-producer-based criterion over the PD-CO-match-based criterion, because a chain of dependent producer/consumer prefetches is likely to become inaccurate after a memory re-allocation if one link in the chain turns out not to have a true dependent relationship, so it can be more important to prioritise retention of entries satisfying the PD-CO match condition than entries satisfying the self-producer condition.

Hence, in one example, the replacement policy may be controlled such that the replacement control circuitry is configured to:
  allow the new candidate producer-consumer relationship to replace one of said one or more existing candidate producer-consumer relationships having less than a threshold level of usefulness; and
  when none of said one or more existing candidate producer-consumer relationships has less than the threshold level of usefulness and the new candidate producer-consumer relationship satisfies the PD-CO match condition, allow the new candidate producer-consumer relationship to replace one of said one or more existing candidate producer-consumer relationships which fails to satisfy the PD-CO match condition; and
  when none of said one or more existing candidate producer-consumer relationships has less than the threshold level of usefulness, an existing candidate producer-consumer relationship fails to satisfy both the PD-CO match condition and the self-producer condition, and the new candidate producer-consumer relationship satisfies the self-producer condition, allow the new candidate producer-consumer relationship to replace the existing candidate producer-consumer relationship which fails to satisfy both the PD-CO match condition and the self-producer match condition.

As mentioned above, the PD-CO match condition is indicative of the producer data of the given producer load matching an address operand of the given consumer load. The consumer load can have a number of address operands. For example, the consumer load could include a base address operand and an offset operand, with the base address operand and offset operand being added to form the consumer address. The address operand, which is to match against the producer data in order for the PD-CO match condition to be satisfied, could be either the base address operand (from which an address of the given consumer load is to be calculated by adding an offset indicated by an offset operand to the base address) or the offset operand (indicating an offset to be added to a base address to calculate an address of the given consumer load).

The PD-CO match condition is indicative of the producer data of the given producer load matching an address operand of the given consumer load. In some examples, the PD-CO match condition may be evaluated precisely, based on detecting an exact match between the producer data and the address operand.

However, in other examples some level of imprecision in evaluating the PD-CO match condition may be allowed, to reduce the circuit area and power cost of implementing the match determining circuitry. For example, the comparison performed to evaluate the PD-CO match condition may not be based on the full number of bits of the producer data and consumer operand, or could be based on a hash value which is derived from the producer data or consumer operand which may support some aliasing of different values of the producer data and consumer address onto the same hash value. In this case, it may be possible for the PD-CO match condition to be considered satisfied even if there is not an exact match between the producer data and the consumer address. Even if there is a possibility for some false positive detections of the PD-CO match condition being satisfied, this can be tolerated because for a prefetcher occasionally generating the wrong prefetch request is not a problem since it will not affect the correctness of processing carried out by processing circuitry, and only affects performance based on a slightly lower cache hit rate than would otherwise be possible if the prefetch was correct. Hence, even if occasional false positive PD-CO match conditions are identified, this may not significantly reduce performance and the saving in circuit area and power cost may be considered more significant so as to justify the decision not to expend extra circuit resource for supporting exact determination of the PD-CO match condition.

If the producer data is expected to be used as offset operand, the PD-CO match condition can be evaluated for a given candidate producer-consumer relationship between a given producer load and a given consumer load by comparing the producer data with the offset operand of the given consumer load.

On the other hand, if the producer data is expected to be used as the base address operand, while one approach is to evaluate the PD-CO match condition for the given candidate producer-consumer relationship based on a comparison of the base address operand of the given consumer load with the producer data of the given producer load, the comparison performed to evaluate the PD-CO match condition does not necessarily need to be applied to the particular operand considered to be matched against the producer data if the PD-CO match condition is satisfied. In fact, the comparison can often be done more efficiently by basing the comparison on the offset operand, even if the aim is ultimately to check whether the base address operand matches the producer data. This is because typically the offset has fewer bits than the base address, so can be compared with a smaller comparator, saving circuit area and power consumption.

This can be useful where the candidate producer-consumer relationship is indicative of a consumer offset between producer data loaded by a producer load and a consumer target address of a consumer load. In that case, for a given consumer target address C, the training circuitry may learn the consumer offset Off_C from the consumer target address C and the producer data PD of the producer load according to the relation Off_C=C−PD (which can be rearranged as C=PD+Off_C). However, the actual consumer target address C is computed based on the operands of the consumer load as C=Base+Off_O, where Base is the base address operand and Off_O is the offset operand. Hence, C=PD+Off_C=Base+Off_O. If the producer data is to be used as the base address operand then, for the PD-CO match condition to be satisfied we expect PD=Base, and so we have: PD+Off_O=PD+Off_C, which can be simplified to Off_O=Off_C. Therefore, even if it is the base address operand which is expected to match the producer data, the PD-CO match condition can be evaluated for a given candidate producer-consumer relationship between a given producer load and a given consumer load, by checking whether the offset operand Off_O of the given consumer load matches the consumer offset Off_C learnt by the training circuitry based on the difference between the producer data PD loaded by the given producer load and the consumer target address C of the given consumer load. For producer/consumer loads that have the true dependent relationship, it is more likely that PD=Base and so Off_O=Off_C, while for producer/consumer loads that have the false dependent relationship it is less likely that PD=Base and so Off_O may not match Off_C. Hence, comparing the offsets can provide a useful indication of whether the true dependent relationship regardless of which operand (base address or offset) is set based on the producer data.

The comparison of the offset operand of the given consumer load and the consumer offset learnt from the difference between the producer data and the consumer target address may be performed in an imprecise manner, permitting some false positive matches, as discussed above. For example, this may be because, to reduce circuit area costs, part of the producer data and the consumer target address may be hashed to reduce the number of bits, and so the resulting imprecision in the consumer offset may affect the comparison with the offset operand. Hence, it is sufficient for the match to be determined approximately, rather than being required to be performed precisely.

Hence, the match determining circuitry may determine whether the given candidate producer-consumer relationship satisfies the PD-CO match condition based on a comparison of at least a subset of bits of the consumer offset for the given candidate producer-consumer relationship and an offset operand of the given consumer load indicating an offset to be added to a base address to calculate the consumer target address of the given consumer load. This will tend to reduce the number of bits required to be compared, when compared with the number of bits compared if the producer data was compared against the base address operand of the consumer load.

When comparing the consumer offset and the offset operand, further savings in circuit area and power consumption can be achieved by limiting the number of bits of the consumer offset and offset operand that are compared against each other. In some examples, the match determining circuitry can exclude at least one least significant bit of the consumer offset and the offset operand from the subset of bits used for the comparison for determining whether the given candidate producer-consumer relationship satisfies the PD-CB match condition. This is because often, when a pointer loaded from memory is used as a base address for a subsequent load, the pointer will have a number of least significant bits all set to 0, because it may often be more logical to allocate the start of an object at an address aligned to a certain address size boundary having a number of least significant bits set to 0, with subsequent offsets then being specified relative to that address which will be added to the lower bits of the pointer. Hence, expending circuit resource on providing comparison circuits for comparing the lower bits which will almost always be zero may be unnecessary.

In some examples, when a magnitude of the offset operand is greater than a threshold value, the match determining circuitry is configured to determine that the given candidate producer-consumer relationship fails to satisfy the PD-CB match condition. This can be useful for limiting the scope of the comparison as it means that the match determining circuitry can exclude, from the subset of bits used for the comparison for determining whether the given candidate producer-consumer relationship satisfies the PD-CB match condition, at least one most significant bit of the offset operand which corresponds to a bit position representing a bit with greater magnitude than the threshold value. Again, this saves circuit area and power. Although this may mean that some true dependent relationships are not detected, in practice the extra circuit area and power consumption associated with the comparison of more significant bits may not be justified as in practice most cases with a true dependent relationship may have a relatively small offset between the producer data and the consumer address. Hence, overall this approach can provide a better balance between performance and circuit overhead (circuit area and power).

The training table maintained by the training circuitry could in some examples be used directly to form the predictions of the relationships between producer and consumer prefetchers generated by the prefetch generation circuitry.

However, in some examples the prefetch generation circuitry generates the producer prefetch and the consumer prefetch based on producer-consumer relationships indicated in a pattern history table separate from the training table. The training circuitry can promote, to the pattern history table, a candidate producer-consumer relationship of the training table meeting a promotion condition (e.g. a candidate producer-consumer relationship which has been trained for a certain period, or has met certain usefulness requirements). By having separate training and pattern history tables this can reduce the likelihood that producer-consumer relationships found to be reliable are evicted as a result of the replacement policy, as the most useful producer-consumer relationships can be promoted to the pattern history table, while the replacement control circuitry is replacing existing candidate producer-consumer relationships with new candidate producer-consumer relationships in the training table from time to time. This approach can also help to reduce circuit area cost because the training table may need to be larger than the pattern history table to account for allocation of entries which are being trained which subsequently turn out not to be useful, so by providing a separate pattern history table to record the successful relationships learnt by the training, fewer entries need to be looked up when generating the actual prefetch predictions.

In the training table (and, if provided, the pattern history table), some implementations may organise the producer-consumer relationships such that each entry of the table relates to a single producer load and a single consumer load and specifies the relationship between the producer data of the producer load and the consumer address of the consumer load.

However, in practice workloads may generate addresses of two or more different loads based on a pointer loaded from memory, and so the same producer load may be related to two or more different consumer loads. While in an implementation where each entry maps a single producer load to a single consumer load, it might be possible to allocate multiple entries for the same producer load, a more efficient table organisation can be to provide the training table with a number of training entries, where each entry specifies two or more candidate producer-consumer relationships between the same producer load and two or more different consumer loads. This can reduce the number of lookups into the table required to be able to learn relationships for controlling multiple consumer prefetches to be based on a single producer prefetch. A similar organisation can be used for the pattern history table.

Hence, the replacement control carried out by the replacement control circuitry may be for determining which of the fields relating to respective consumer loads indicated in a particular training entry should be replaced with information for new consumer load related to the same producer load. In other words, the new candidate producer-consumer relationship and the one or more existing candidate producer-consumer relationships being considered in the replacement policy may all relate to the same producer load, but different consumer loads. Hence, the PD-CO match condition may be applied to a consumer replacement policy for replacing one consumer with another in an entry mapping a single producer to multiple consumers.

There may be a separate producer replacement policy criterion applied by the replacement control circuitry, for determining when a given training entry relating to a particular producer load should be evicted or replaced in the training table to make space for another training entry relating to a different producer load. The producer replacement policy criterion does not necessarily need to involve a PD-CO-match-based replacement policy criterion, and could instead be a simpler policy criterion such as least recently used, or be based on combined usefulness of the respective producer-consumer relationships indicated in the training entry, for example. Alternatively, other implementations may also apply a PD-CO-match-based replacement policy criterion when selecting which producer's training entry should be replaced with a new entry.

Examples of Indirect Prefetching Based on Producer-Consumer Relationships

In accordance with some examples there is provided a data processing apparatus comprising: a data cache to store local copies of data items for use during execution of instructions by processing circuitry; a producer pattern history table to store a plurality of producer-consumer relationships, each producer-consumer relationship defining an association between a producer load indicator and a plurality of consumer load entries, each consumer load entry comprising a consumer load indicator and one or more usefulness metrics; and prefetch generation circuitry to generate a prefetch of data for the data cache based on a data load from an address, wherein the prefetch generation circuitry is adapted to, when the data load corresponds to the producer load indicator in the producer pattern history table and when at least one of the corresponding one or more usefulness metrics associated with the producer load indicator meets a criterion: initiate a producer prefetch of the data; and when the data is returned, issue one or more consumer prefetches, each consumer prefetch to return corresponding consumer data from a corresponding consumer address generated from the data returned by the producer prefetch and a corresponding consumer load indicator of a corresponding consumer load entry.

During the execution of instructions the processing circuitry may make use of a number of data items. Data items stored as local copies in the data cache provide lower latency during accesses due to the physical locality of the cache with respect to the processing circuitry, the bandwidth for data transfer between the processing circuitry and the cache, and so on. If a data item is already present in the cache when it is required by the processing circuitry the data item is accessed more quickly than if the processing circuitry has to wait for the data processing apparatus to retrieve the data item from storage that is located further downstream (i.e., further from the processing circuitry) in the memory hierarchy. In order to reduce the time that the processing circuitry has to wait for data to be retrieved, prefetching techniques are used to predict which data is likely to be required by the processing circuitry before the processing circuitry encounters a load instruction specifying that data. Prefetching circuitry can achieve this for regular and repeating data accesses through the analysis of data access patterns. However, prefetching becomes more difficult in cases where data access patterns have irregular and/or non-repeating access patterns.

A common set of data accesses that have an irregular and/or non-repeating access pattern are loads that exhibit a producer-consumer relationship, where a consumer load is a load that is based on the data returned by the producer load. Producer-consumer relationships may involve a single producer load on which a plurality of consumer loads are based. In order to identify producer-consumer relationships and issue corresponding prefetches there is provided a producer pattern history table. The producer pattern history table stores a plurality of producer-consumer relationships. Each of the producer-consumer relationships define a correspondence between a producer load indicator, which can be used to identify when a load or a prefetch is likely to be a producer load, and a plurality of consumer load entries where each consumer load entry defines a consumer load indicator and one or more usefulness metrics. In this way not only can a load (where it is implicit that such a load may also itself be a prefetch load) be identified as a producer load, but corresponding consumer loads, that have been identified as being likely to be based on the data returned from the producer load, can also be identified and issued as consumer prefetches.

In response to a data load/prefetch from an address, the prefetch generation circuitry first checks to determine whether the data load corresponds to a producer load indicator stored in the producer pattern history table. If the data load hits in the producer pattern history table then it is determined, based on whether the one or more usefulness metrics (which will be described in more detail below)

associated with the entry that hit in the producer pattern history table meet a criterion, whether to generate a producer prefetch corresponding to the load. If the criterion is met, then the prefetch generation circuitry generates a producer prefetch specifying the data. When the data has been returned, the prefetch generation circuitry is able to use this data, in combination with the plurality of corresponding consumer load indicators, to generate one or more consumer prefetches based on this data. In this way loads that exhibit a producer-consumer relationship can be identified and a producer prefetch can be issued, from which one or more consumer prefetches can be issued once the data associated with the producer prefetch has been returned. Whilst the producer pattern history table is adapted to store a plurality of (two or more) consumer prefetches in association with each producer prefetch, the prefetch generation circuitry may generate one or more consumer prefetches as discussed below.

The producer load indicator may comprise any indicator that defines the producer load. For example, in some embodiments the producer load indicator may comprise a program counter value indicative of the program position of the producer load instruction corresponding to the producer load. In other alternative embodiments the producer load indicator may comprise an address indicator indicative of an address from which data associated with the producer load is to be loaded. Similarly, the consumer load indicator comprises an indicator that defines the consumer load. For example, the consumer load indicator may comprise a program counter value indicative of a program position of the consumer load instruction corresponding to the consumer load. Alternatively, the consumer load indicator may comprise a program counter offset or other information from which the program counter value indicative of a position in the consumer load instruction can be derived.

In accordance with some example configurations the consumer load indicator comprises an offset in address space between the data returned by the producer prefetch and the corresponding consumer address. In this way the offset can be combined with the data returned by the producer prefetch in order to determine the corresponding consumer address. The person of ordinary skill in the art will recognise that this is not the only way in which the consumer load indicator could be defined and that, in other embodiments, the consumer load indicator could comprise any information from which the consumer address can be derived. For example, the consumer load indicator could comprise an operand to be used in a mathematical operation from which the consumer address can be calculated. Such operands include, but are not limited to: a partial offset such that the consumer address can be derived from the data returned from the producer prefetch, the partial offset and another offset either hardwired into the prefetch generation circuitry or defined elsewhere in the data processing apparatus; a multiplier to generate the consumer address as a result of the data returned from the producer prefetch multiplied by the multiplier; an index into a table identified by the data returned from the producer prefetch; and so on.

In accordance with some example configurations, when the consumer load indicator corresponds to a further producer load indicator in the pattern history table, the consumer prefetch is issued as a further producer prefetch. This results in a potentially recursive scheme in which a first producer load can generate a first plurality of consumer prefetches, and where each of the first plurality of consumer prefetches could correspond to an entry in the producer pattern history table. For each of the first plurality of consumer prefetches that corresponds to an entry in the producer pattern history table, the corresponding consumer prefetch is instead issued as a producer prefetch which will generate a second plurality of consumer prefetches. Each of the second plurality of consumer prefetches may, in turn, also be issued as producer prefetches if they correspond to an entry in the producer pattern history table.

In accordance with some example configurations, issuing the further producer prefetch is independent of whether the corresponding usefulness metric meets the criterion. As the initial prefetch is only issued as a producer prefetch when the corresponding usefulness metric meets the criterion, the further producer prefetches may be assumed to meet the usefulness criterion because the producer prefetch has already been determined to be useful.

In accordance with some example configurations the further producer prefetch is associated with a prefetch depth counter indicative of a number of preceding producer prefetches from which the further producer prefetch is derived, and wherein when the prefetch depth counter reaches a depth threshold, the further producer prefetch is discarded. As a result of the recursive way in which producer prefetches may be generated, it is possible that the producer prefetch can generate a further producer prefetch, which in turn generates a still further producer prefetch. In order to prevent the possibility of recursive generation of producer prefetches continuing indefinitely, the prefetch generation circuitry restricts the maximum number of recursively generated producer prefetches from exceeding a maximum depth defined by the depth threshold. For example, if the depth threshold was three, then the producer prefetch (depth counter=0) could generate a further producer prefetch (depth counter=1) which could, in turn, generate another further producer prefetch (depth counter=2). However, the another further producer prefetch (depth counter=2) would be unable to generate a producer prefetch with depth counter=3 because the depth counter has reached the threshold depth. It will be appreciated by the person of ordinary skill in the art that the choice of three for the depth threshold is purely by way of example and that any value could be used for the threshold depth. In addition, the condition of the depth counter reaching the threshold depth could be implemented by checking if the depth counter is equal to the depth threshold; checking if the depth counter has exceeded a number that is one less than the depth threshold; or by any other means by which the depth counter can be compared to the depth threshold.

In accordance with some example configurations the one or more usefulness metrics for each entry of the plurality of consumer load entries comprise a confidence value indicative that a previous load based on the corresponding consumer address was issued subsequent to the producer load, and wherein the criterion being met requires the confidence value to reach a confidence threshold. The confidence value provides a measure of whether it is likely that the consumer address, generated from the data returned by the producer prefetch and a corresponding consumer load indicator of the corresponding consumer load entry, is going to be used in a load subsequent to the producer load. In some embodiments the confidence value could be represented by a single bit indicative of whether the consumer load based on the consumer address has been observed to occur subsequent to the producer load more than a threshold number of times. In alternative embodiments, the confidence value could be represented by a counter that is indicative of a number of times that the consumer load based on the consumer address has been observed to occur subsequent to the producer load.

In this way, the prefetch generation circuitry can be adapted to only issue consumer loads for which, based on previous observations, it is determined that there is a reasonable likelihood that a load based on the consumer address will follow the load based on the producer address.

In accordance with some example configurations, in addition to determining whether one or more of the confidence values associated with the producer meets a confidence threshold, the data processing apparatus may determine which consumer prefetches to issue based on whether the confidence value associated with the consumer entry meets the confidence threshold.

In accordance with some example configurations the one or more usefulness metrics for each entry of the plurality of consumer load entries comprises a timeliness value indicative of whether data loaded based on the address generated from the producer data is likely to return in time to generate a timely consumer prefetch, and wherein the criterion being met further requires the timeliness value to indicate that the producer data is likely to return in time to generate the timely consumer prefetch. The timeliness value indicates that it is likely that the data required to be returned from the consumer load is not required until a sufficient period of time has elapsed, subsequent to the producer load being issued, such that the producer load has returned the data to be used in the generation of consumer load address. For example, if the consumer load immediately follows the producer load in program execution order, it may be expected that there is not sufficient time for the producer load to return data before the consumer load based on the data returned from the producer load is issued. In this case, it may not be beneficial to issue a consumer load and therefore the timeliness value would indicate the data loaded is unlikely to return in time. The timeliness indicator may be variously defined. In some embodiments the timeliness indicator may be a single bit indicative of whether or not the consumer load is likely to return in time to generate the timely consumer prefetch. In other embodiments the timeliness value may comprise a counter indicative of a time difference between the issuing of the producer load and the issuing of the consumer load from which it can be determined, at the time that the prefetch is to be issued, whether there would be sufficient time for the data to return.

In accordance with some example configurations where the usefulness metric comprises both a confidence value and a timeliness value, the prefetch generation circuitry may be adapted to initiate the producer prefetch based on an indication that at least one of the corresponding consumer entries has both a confidence value meeting a confidence threshold and a timeliness value that indicates that the producer data is likely to return in time to generate the timely consumer prefetch. In this way producer prefetches are only generated that are inherently timely and where there is an indication that the producer prefetch will return data in that is timely with respect to a consumer prefetch for which there is a confidence value meeting the threshold confidence. In addition, when the data is returned, the prefetch generation circuitry may issue consumer prefetches independent of the corresponding timeliness values, but in dependence on the confidence value, such that only consumer entries that have a confidence value that meets the confidence threshold are issued as consumer prefetches. This is because it is assumed that, if the consumer prefetches are upgraded to further producer prefetches they will already be inherently timely due to the timeliness criterion being met by the producer prefetch.

In accordance with some example configurations the data processing apparatus further comprises producer training table circuitry to store a producer training table comprising a candidate producer-consumer relationship, and training circuitry to populate the candidate producer-consumer relationship during a training phase based on a plurality of observed loads. The producer training table stores the candidate producer-consumer relationship whilst in the training phase so that the candidate producer-consumer relationship can be built up based on the plurality observed loads. The training phase can occur either in parallel to the issuing of producer prefetches and consumer prefetches by the data processing apparatus, or during a separate training phase in which the issuing of prefetches is suppressed.

In accordance with some example configurations the one or more usefulness metrics comprises a confidence value indicative that a previous load based on the corresponding consumer address was issued subsequent to the producer load, and the training circuitry is adapted to, at the start of the training phase: when an observed load of the training phase corresponds to an existing producer load indicator in one of the plurality of producer-consumer relationships stored in the pattern history table: derive a candidate producer-consumer relationship from the producer-consumer relationship corresponding to the observed load; enter the candidate producer-consumer relationship into the producer training table; and modify candidate confidence values associated with the candidate producer-consumer relationship in a first direction; and when the observed load of the training phase does not correspond to the existing producer load indicator in any of the plurality of producer-consumer relationships stored in the pattern history table: create the candidate producer-consumer relationship comprising information indicative of the observed load; and enter the candidate producer-consumer relationship into the producer training table.

During the training phase, the training circuitry selects an observed load to be inserted into the training table stored in the training table circuitry. The observed load is selected as a load issued during the training phase, although the observed load could also be selected prior to the training phase. If the observed load corresponds has a load indicator that corresponds to a producer load indicator in an existing producer-consumer relationship that is already present in the producer pattern history table, then the existing producer-consumer relationship is used to derive the candidate producer-consumer relationship to be stored in the producer training table. When the candidate producer-consumer relationship is derived in this way, the candidate confidence values of the candidate producer-consumer relationship are modified in a first direction to indicate that the confidence in the relationship between the candidate producer and the corresponding candidate consumer is reduced. Alternatively, if the observed load has a load indicator that does not correspond to a producer load indicator in an existing producer-consumer relationship, then the candidate producer-consumer relationship to be entered into the training table is derived based on information indicative of the observed load.

In accordance with some example configurations the producer training table is adapted to store, in association with the candidate producer-consumer relationship, data returned in response to the observed load. By storing the data returned in response to the observed load, the producer training table is able to determine if a relationship exists between subsequently observed loads and the observed load.

In accordance with some example configurations for each subsequent observed load of the plurality of observed loads, in response to detecting a match between a most significant portion of the data returned by the observed load and a candidate address associated with the subsequent observed load, the training circuitry is adapted to derive a candidate consumer entry based on a difference between the least significant portion of the data returned by the observed load and the candidate address associated with the subsequent observed load. A match between the most significant portion of the candidate address and the most significant portion of the data returned by the observed load indicates that the data returned by the observed load could define an address that is close in address space to the candidate address. When this is the case the training circuitry uses the candidate address and the data returned by the observed load to derive the candidate consumer entry. As previously discussed, in some embodiments the candidate consumer entry could comprise a consumer offset in address space. In such embodiments the consumer offset could be given by the difference between the least significant portion of the data returned by the observed load and the least significant portion of the candidate address. In some embodiments the candidate consumer information can be derived by any method for which there is a one-to-one relationship between the consumer information and the difference between the candidate address and the least significant portion of the data returned by the observed load.

In accordance with some example configurations the training circuitry is adapted to: when the candidate consumer entry corresponds to an existing consumer entry of the candidate producer-consumer relationship, modify an existing candidate confidence value of the existing consumer in a second direction; when the candidate consumer entry is different from each existing consumer entry of the candidate producer-consumer relationship and when an existing consumer entry of the candidate producer-consumer relationship has a candidate confidence value that meets a replacement criterion, replace the existing consumer entry having with the candidate consumer entry; and when the candidate consumer entry is different from each existing consumer entry of the candidate producer-consumer relationship and when a corresponding candidate confidence value of each existing consumer entry does not meet the replacement criterion, discard the candidate consumer entry. In this way the existing consumer entries of the candidate producer-consumer relationship are kept up to date based on the subsequent observed loads in the training phase. As previously discussed, at the start of the training phase the confidence values of the candidate producer-consumer relationship are modified in a first direction (or "aged") to indicate that the confidence in those predictions has reduced since the producer-consumer relationship was derived. When the subsequent observed loads of the training phase have a similar behaviour to those observed in a previous training phase, as represented by the existing consumer entries, the confidence values of the existing consumer entries will be modified in a second direction to indicate that a load corresponding to the existing consumer entry is still being observed. As a result, the consumer load indicators of the existing consumer entry are likely to meet the usefulness criterion and a greater number of consumer prefetches will be issued. On the other hand, when the subsequent observed loads of the training phase have a different observed behaviour to those observed in a previous training phase, as represented by the existing consumer entries, the existing consumer entries are more likely to meet the replacement criterion and be replaced as a result of having their confidence values modified in the first direction. In the event that the confidence in all the existing consumer entries associated with the producer-consumer relationship remain high, the candidate consumer entry is discarded.

In accordance with some example configurations the one or more usefulness metrics further comprises a timeliness value indicative of whether data loaded based on the address generated from the producer data is likely to return in time to generate a timely consumer prefetch, and wherein the training circuitry is adapted to, when a difference between the observed load and the subsequent observed load meets a difference criterion, set a candidate timeliness value of the candidate producer-consumer relationship. In this way the timeliness of consumer entries of the candidate producer-consumer relationship can be kept up to date for subsequent use to determine whether a candidate producer prefetch issued based on the candidate producer-consumer relationship will generate timely consumer prefetches. In some embodiments, the timeliness value is only considered in the generation of producer prefetches based on an initial load, whilst on the other hand producer prefetches based on a prefetch are assumed to be inherently timely because the prefetch on which they are based being inherently timely.

In accordance with some example configurations the difference between the observed load and the subsequent observed load is one of: a difference in program counter value; a number of loads; and a number of cycles. It would be readily apparent to the person of ordinary skill in the art that any measure of a temporal difference between the observed load and the subsequent observed load could be used to set the timeliness metric.

In accordance with some example configurations subsequent to the plurality of observed loads the candidate producer-consumer relationship is inserted into the pattern history table. In this way the producer pattern history table is kept up to date based on the latest observed behaviour during the training phase. When the candidate producer-consumer relationship is derived from an existing entry in the producer pattern history table, the candidate producer-consumer relationship replaces the existing entry from which it was derived. However, when the candidate producer-consumer relationship is based on a load that does not correspond to an existing entry of the producer pattern history table, the candidate producer-consumer relationship may be inserted into the producer pattern history table based on a replacement policy. Typical replacement policies will be known to the person of ordinary skill in the art. For example, the least recently used entry of the pattern history table could be replaced by the candidate producer-consumer relationship. In other embodiments, the entry in the producer pattern history table with the lowest total consumer confidence values could be replaced. When the producer pattern history table is not full the candidate producer-consumer relationship can be inserted into the producer pattern history table without the need to replace an existing entry.

In accordance with some example configurations the data processing apparatus further comprises stride prefetching circuitry to issue a stride prefetch load based on a predicted stride length, wherein the prefetch generation circuitry is adapted to, when the stride prefetch load corresponds to the producer load indicator in the producer pattern history table, initiate the producer prefetch independent of whether the corresponding usefulness metric meets the criterion. Stride prefetching circuitry generates prefetches based on an analysis of access patterns. Because the producer prefetch is based on a stride prefetch load from the stride prefetching circuitry the producer prefetch inherently corresponds to a prefetch that will be of use. Hence, it is not necessary to check whether the corresponding usefulness metric meets the criterion. In embodiments where the one or more usefulness metrics for each entry of the plurality of consumer load entries comprises a timeliness value indicative of whether data loaded based on the address generated from the producer data is likely to return in time to generate a timely consumer prefetch, the generation of the producer prefetch from a stride prefetch load means that there is already a difference between a current program counter value and the program counter value associated with the stride prefetch. Hence, the producer prefetch will be inherently timely due to the difference already present. In this way a greater number of producer prefetches and hence consumer prefetches can be issued resulting in a lower latency observed by the processing circuitry when executing instructions.

In accordance with some example configurations the data processing apparatus further comprises producer tag table circuitry to store a producer tag table comprising a plurality of prefetch entries defining in-flight prefetches, each prefetch entry comprising a prefetch data address, wherein initiating each producer prefetch comprises generating a candidate producer entry for insertion into the producer tag table, and wherein initiating each consumer prefetch comprises generating a candidate consumer entry for insertion into the producer tag table. In this way, the producer tag table circuitry is able to keep track of each in flight prefetch and to ensure that consumer prefetches are scheduled subsequent to the completion of the corresponding producer prefetch.

In accordance with some example configurations each entry in the producer tag table further comprises a prefetch identifier, wherein the data processing apparatus is adapted to, in response to generation of the candidate producer entry: when a candidate prefetch data address of the candidate producer matches an existing entry in the producer tag table, discard the candidate producer entry; when the candidate prefetch data address of the producer entry corresponds to a same cache line as an existing entry in the producer tag table, insert the candidate producer entry into the producer tag table with a same prefetch identifier as the existing entry; and when the candidate prefetch data address of the candidate producer entry is different to all existing entries in the producer tag table, insert the candidate producer entry into the producer tag table with a new prefetch identifier. In this way the data processing apparatus is prevented from issuing producer prefetches corresponding to a same block of memory twice. In particular, where the candidate prefetch data address matches an existing entry, the existing entry will already ensure that the data is prefetched. Hence, issuing the candidate producer as a second prefetch for the same data would be wasteful and it is discarded. Alternatively, when the candidate prefetch data address of the producer entry corresponds to the same cache line as an existing entry in the producer tag table, but to a different entry within the cache line, the candidate producer entry is added into the producer tag table to indicate that a different entry from the cache line is required, but a same prefetch identifier as the existing entry is used to prevent the data processing apparatus from issuing a prefetch for the same cache line multiple times. Finally, if the candidate prefetch data address is different to all existing entries in the producer tag table then the candidate producer entry corresponds to a different prefetch and it is inserted into the producer tag table with a new prefetch identifier.

In accordance with some example configurations the data processing apparatus further comprises a sequence buffer to store the data returned from the producer prefetch in association with data indicative of a corresponding producer tag table entry; and sequencer circuitry to, when the data returned from the producer prefetch reaches a head of the sequence buffer: sequentially generate a plurality of consumer addresses to be sent as the one or more consumer prefetches; and invalidate the corresponding producer tag table entry. In this way the consumer prefetches are held until the corresponding data from the producer prefetch is returned to the sequence buffer. Once the data has been returned and the data reaches the head of the sequence buffer, the sequencer circuitry generates the consumer addresses based on the data that has been returned and issues the plurality of consumer prefetches. Once the plurality of consumer prefetches are issued the corresponding producer entry in the producer tag table can be invalidated.

Particular examples will now be described with reference to the figures.

FIG. 1 illustrates details of a data processing apparatus 10 in accordance with some example configurations. The data processing apparatus 10 comprises: processing circuitry 12 to execute instructions; a data cache 14 to store local copies of data items for use during execution of the instructions by the processing circuitry 12; a producer pattern history table 18 to store a plurality of producer-consumer relationships 30(1), 30(2), . . . , 30(N), where the number in parentheses indicates which entry of the pattern history table the corresponding information relates to; and prefetch generation circuitry 16 to generate a prefetch of data for the data cache 14 based on a data load from an address. Each of the producer-consumer relationships 30 comprises a producer load indicator 20 and a plurality of consumer load entries. Each consumer load entry comprises a consumer load indicator 22, 26 and one or more usefulness metrics 24, 28. The prefetch generation circuitry 16 is adapted to determine, in response to a data load, if the data load corresponds to a producer load indicator 20 of a producer-consumer relationship 30 in the producer pattern history table 18 and if at least one of the corresponding usefulness metrics 24, 28 meets a criterion. When the aforementioned conditions are satisfied, the prefetch generation circuitry 16 initiates a producer prefetch of the data and, when the data is returned, the prefetch generation circuitry 16 issues one or more consumer prefetches, each consumer prefetch to return corresponding consumer data from a corresponding consumer address generated from the data returned by the producer prefetch and a corresponding consumer load indicator 22, 26.

Figure 2:
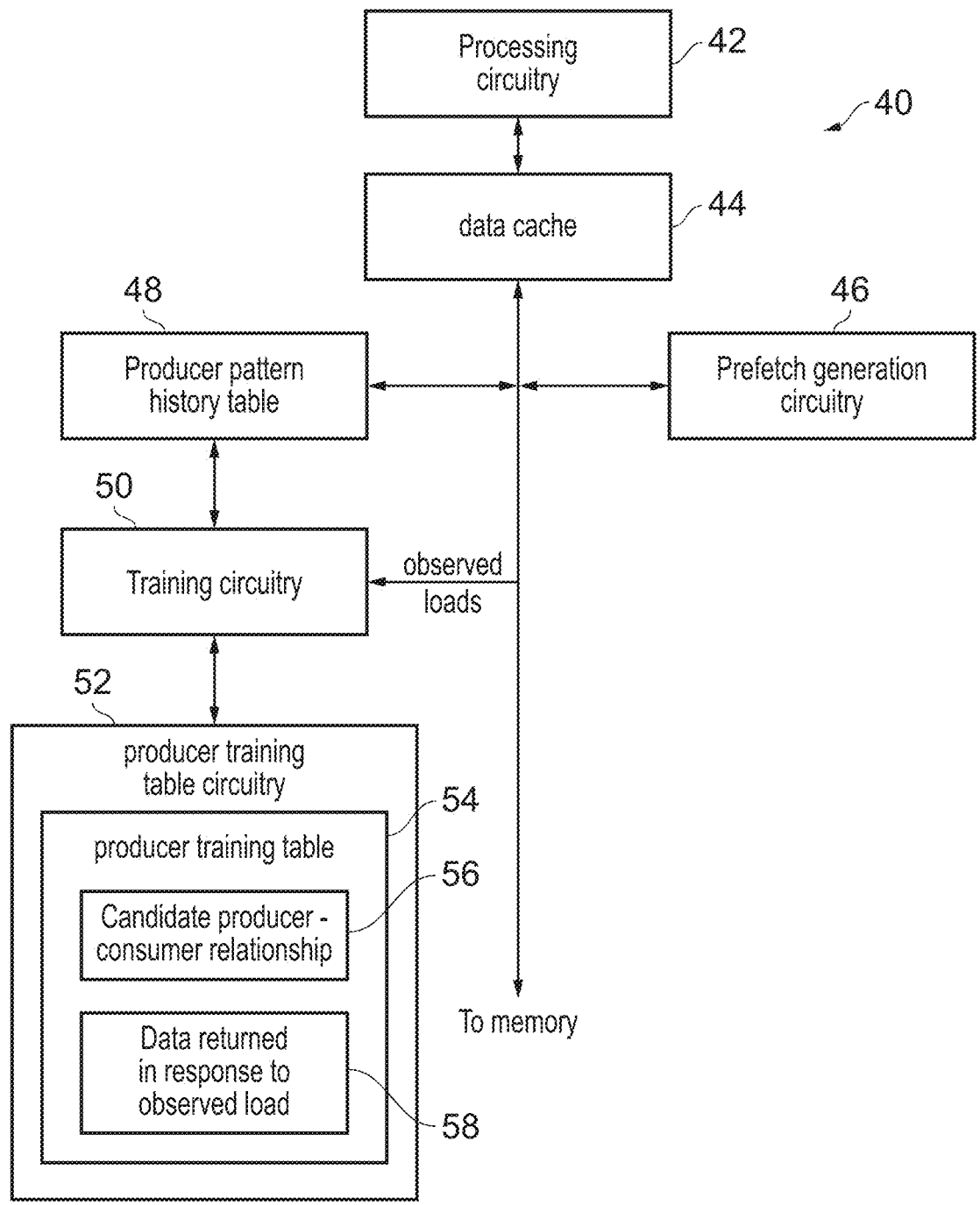
FIG. 2 schematically illustrates details of a data processing apparatus comprising training circuitry.

FIG. 2 illustrates details of a data processing apparatus 40 comprising training circuitry 50 for use in the training phase. The data processing apparatus 40 comprises a number of components common to the data processing apparatus 10 described in detail in reference to FIG. 1, and these common features will therefore only briefly be described here. The data processing apparatus 40 comprises processing circuitry 42, a data cache 44, prefetch generation circuitry 46 and a producer pattern history table 48. In addition, data processing apparatus 40 comprises training circuitry 50 and producer training table circuitry 52 to store a producer training table 54. The training circuitry 50 is adapted to populate a candidate producer-consumer relationship 56 stored in the producer training table 54 during a training phase based on a plurality of observed loads. The producer training table 54 comprises the candidate producer-consumer relationship 56 and data returned in response to an observed load 58 at the start of the training phase. When the observed load corresponds to a producer-consumer relationship 30 in the producer pattern history table the candidate producer-consumer relationship 56 is derived from the corresponding producer-consumer relationship 30. For example, when the observed load corresponds to producer-consumer relationship 30(b), the candidate producer-consumer relationship 56 is derived from the producer-consumer relationship 30(b). The candidate producer-consumer relationship in this example case comprises information relating to a producer load indicator 20(b) and a plurality of consumer load entries. Each consumer load entry comprises a consumer load indicator 22(b), 26(b) and one or more usefulness metrics 24(b), 28(b). During the training phase the training circuitry 50 updates the candidate producer-consumer relationship 56 stored in the producer training table 54 based on a plurality of observed loads. Once the training phase is completed, the training circuitry 50 enters the candidate producer-consumer relationship 56 into the producer pattern history table 48 for use in subsequent producer prefetches and consumer prefetches.

Figure 3:
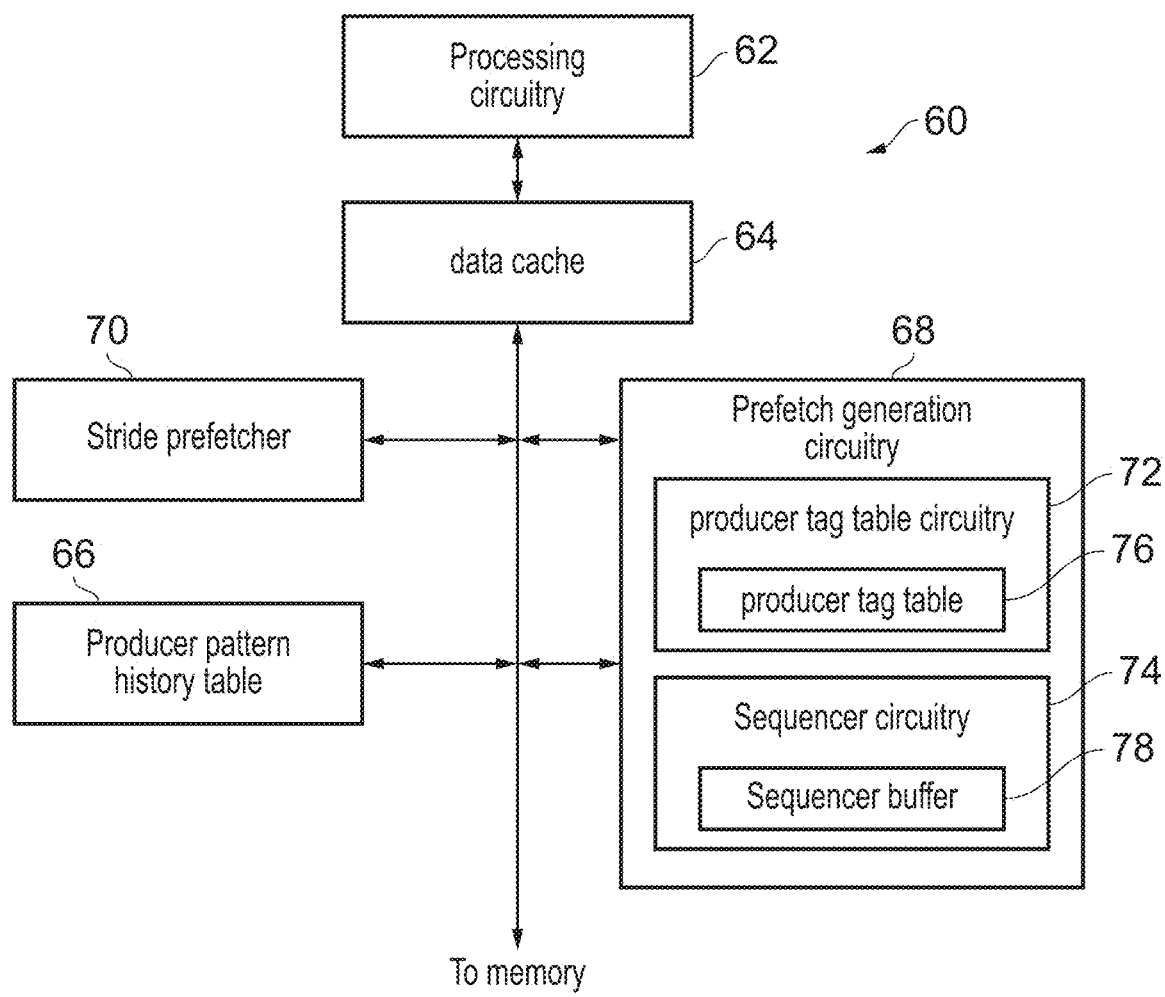
FIG. 3 schematically illustrates details of a data processing apparatus comprising a stride prefetcher.

FIG. 3 illustrates details of a data processing apparatus 60 comprising stride prefetcher 70, producer tag table circuitry 72 and sequence circuitry 74 for use in prefetch generation. The data processing apparatus 60 comprises a number of components common to the data processing apparatus 10 described in detail in reference to FIG. 1, and these common features will therefore only briefly be described here. The data processing apparatus 60 comprises processing circuitry 62, data cache 64, prefetch generation circuitry 68, and producer pattern history table 66. In addition, data processing apparatus 60 comprises stride prefetcher 70 to issue a stride prefetch load based on a predicted stride length, producer tag table circuitry 72 to store producer tag table 76, and sequencer circuitry 74 comprising sequence buffer 78. The stride prefetcher 70 generates and issues stride prefetches based on an analysis of access patterns. Prefetches generated by the stride prefetcher 70 are passed to the prefetch generation circuitry 68 which performs a lookup of the stride prefetch in the producer pattern history table 66. When the stride prefetch corresponds to a producer indicator in the producer pattern history table 66 the prefetch generation circuitry 68 issues a producer prefetch. The producer tag table circuitry 72 determines, for producer prefetches generated based on the stride prefetch or otherwise, whether an entry in the producer tag table 76 corresponds to a same address as the producer prefetch. When this is the case the producer tag table circuitry 72 discards the producer prefetch. The producer tag table circuitry 72 also determines whether an entry in the producer tag table 76 corresponds to an address of a same cache line as the producer prefetch. When this is the case the producer prefetch is entered in the producer tag table but with a prefetch identifier that corresponds to the existing entry in the producer tag table 76 corresponding to the same cache line. When neither of the aforementioned conditions are met, i.e., the producer prefetch does not correspond to a same cache line or a same address as an existing entry in the producer tag table 76, the producer tag table circuitry is adapted to enter the producer prefetch in the producer tag table 76 with a new prefetch identifier. The sequencer buffer 78 stores data returned from producer prefetches and associated data indicative of a corresponding entry in the producer tag table 76. When the data returned from the producer prefetch reaches the head of the sequence buffer 78 the sequencer circuitry 74 is adapted to sequentially generate one or more consumer addresses to be sent as the one or more consumer prefetches, and to invalidate the corresponding entry in the producer tag table 76.

Figure 4:
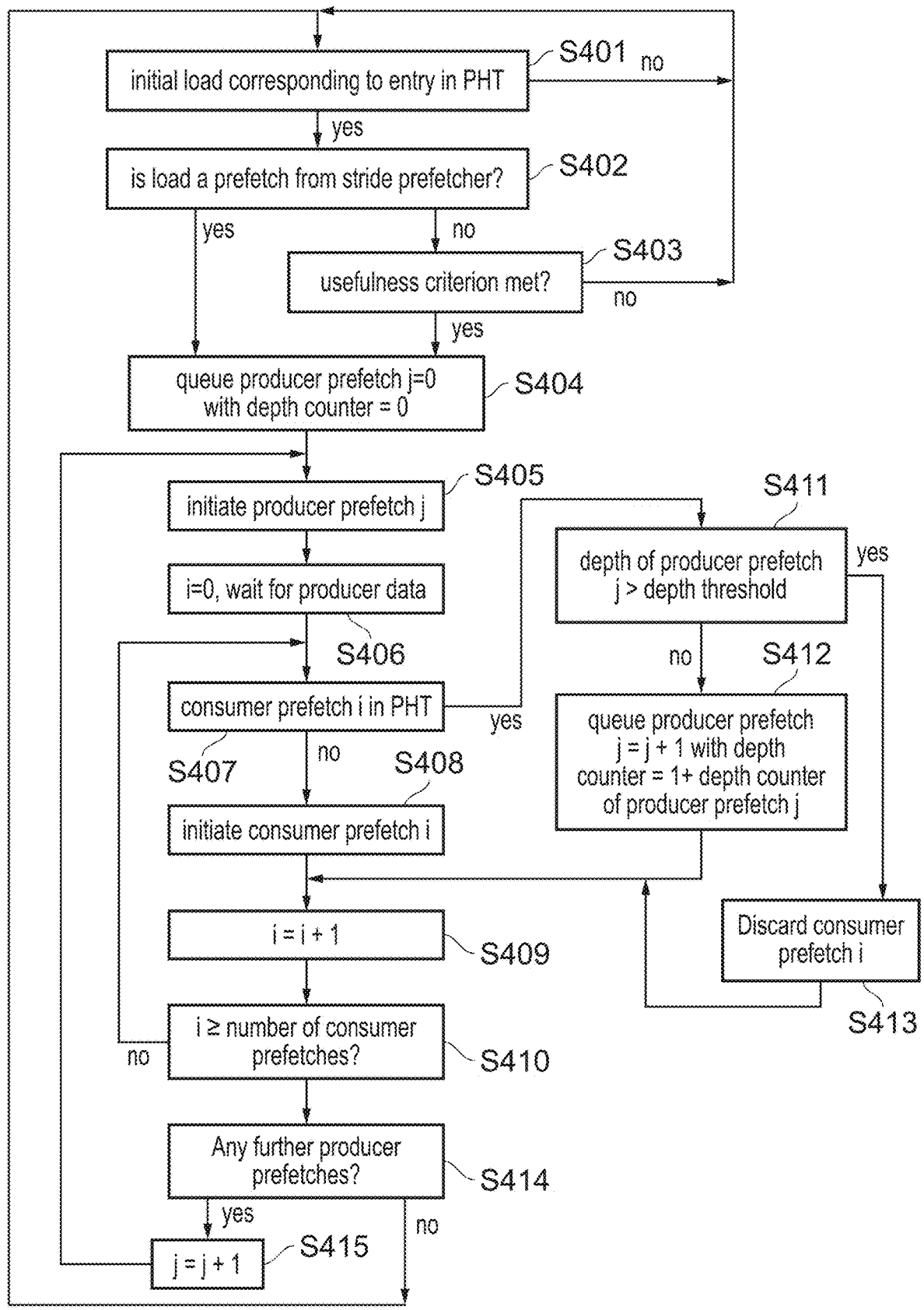
FIG. 4 illustrates a sequence of steps carried out when initiating prefetches.

FIG. 4 illustrates a sequence of steps carried out by prefetch generation circuitry 68 when initiating prefetches. Flow starts at step S401 when an initial load is received and the prefetch generation circuitry 68 determines whether or not the initial load corresponds to a producer indicator stored in the producer pattern history table 66. If no then flow returns to step S401 to wait for another initial load. If yes, then flow proceeds to step S402 where it is determined whether the load is a prefetch generated by the stride prefetcher 70. If yes then flow proceeds to step S404, if no then flow proceeds to step S403 where it is determined whether the usefulness criterion is met. If, at step S403, the usefulness criterion is not met then flow returns to step S401. If however, the usefulness criterion is met then flow proceeds to step S404 where the producer prefetch is queued with producer prefetch counter j=0 and producer depth counter=0. Flow then proceeds to step S405 where producer prefetch j is issued and step S406 where consumer prefetch index i=0 is set and flow waits for the producer data to be returned.

When the producer data is returned, flow proceeds to steps S407-S412 which determine the handling of consumer prefetches. Whilst the steps set out in steps S407-S412 of FIG. 4 illustrate the sequential issuing of consumer prefetches for each producer prefetch, consumer prefetch index i is used purely to illustrate the logical flow of how each consumer load is handled, and that consumer prefetches associated with a same producer load may all be issued in sequence or in parallel. At step S407 it is determined whether consumer prefetch i of the producer-consumer relationship j corresponds to a producer indicator in the producer pattern history table 66. If no then flow proceeds to step S408 where consumer prefetch i is issued before flow proceeds to step S409. If however, at step S407 it was determined that consumer prefetch i of the producer-consumer relationship j did correspond to a producer indicator in the producer pattern history table 66, then flow proceeds to step S411. At step S411 it is determined whether the depth of producer prefetch j is greater than the depth threshold. If no then flow proceeds to step S412 where the consumer prefetch i is upgraded to be issued as a producer prefetch with index j=j+1 and depth counter equal to 1+ the depth counter of producer prefetch j before flow proceeds to step S409. If on the other hand, it was determined at step S411 that the depth of producer prefetch j was greater than the depth threshold then flow proceeds to step S413 where consumer prefetch i is discarded before flow proceeds to step S409. In some embodiments at step S413 consumer prefetch i may be issued as a consumer prefetch rather than being discarded. However, because the depth threshold would be reached if the consumer prefetch i was upgraded to a producer prefetch, a producer prefetch for the corresponding data is not issued. At step S409 the index i is incremented before flow proceeds to step S410. At step S410 it is determined whether all consumer prefetches associated with producer prefetch j have been handled. If no then flow returns to step S407 and the next consumer prefetch is handled. If, on the other hand, it is determined at step S410 that all the consumer prefetches have been handled then flow proceeds to step S414 where it is determined if there are any more producer prefetches. If yes then flow proceeds to step S415 where j is incremented and flow returns to step S405. If, at step S414, it is determined that there are no further prefetches then flow returns to step S401.

Figure 5:
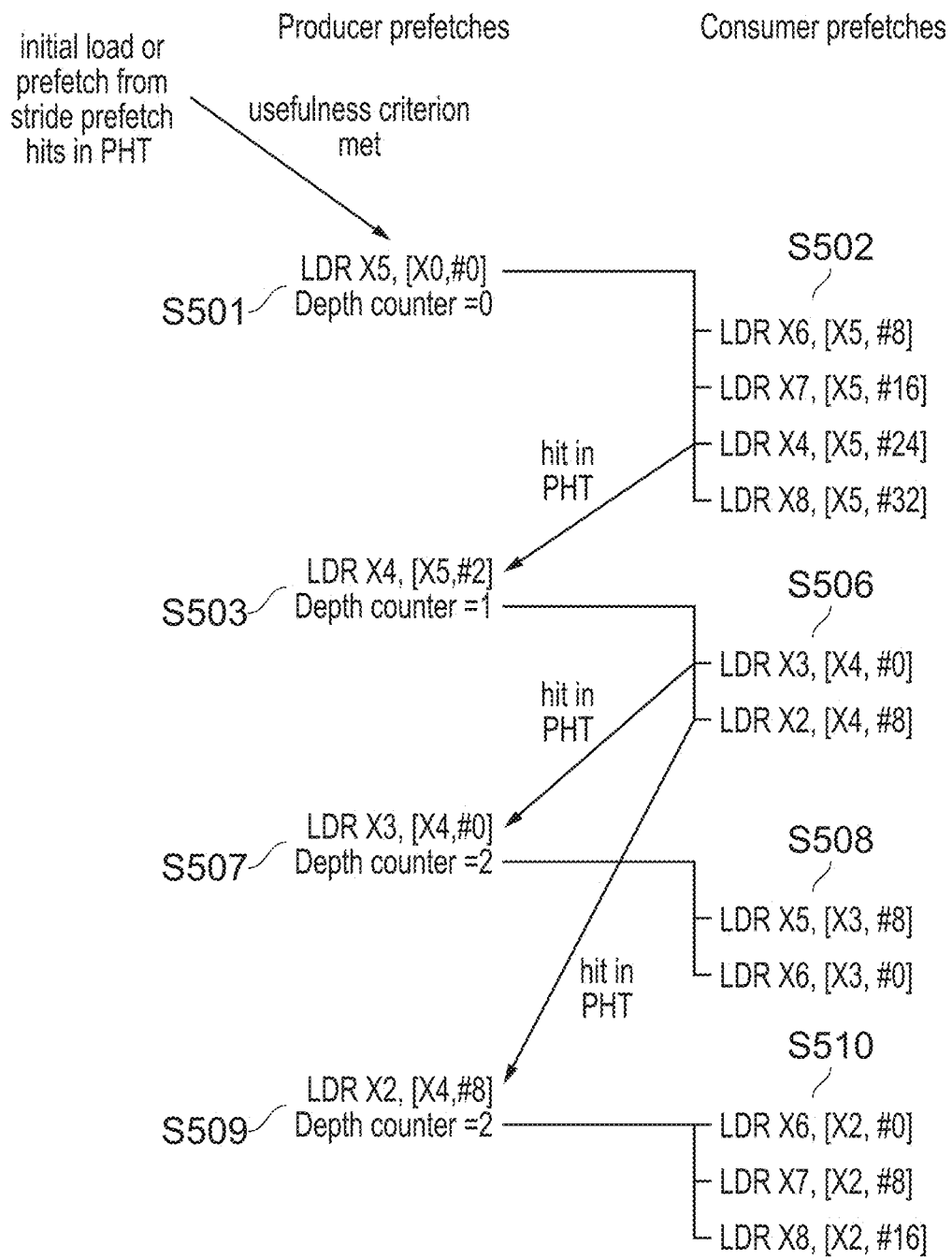
FIG. 5 illustrates a sequence of producer and consumer prefetches being processed.

FIG. 5 illustrates a sequence of producer and consumer prefetches issued based on the logic set out in FIG. 4. As illustrated, in response to an initial load instruction or a prefetch from the stride prefetcher corresponding to instruction LDR x5, [x0, #0] it is found that the load or prefetch from the stride prefetcher hits in the producer pattern history table 66. As a result, at S501, a producer prefetch with depth counter=0 is issued. When the data associated with producer prefetch corresponding to instruction LDR x5, [x0, #0] is returned, the consumer prefetches associated with the producer prefetch can be issued. In this case, at step S502 four consumer prefetches are issued. In particular, in the illustrated embodiment for a consumer prefetch associated with a particular producer prefetch to be issued, the consumer prefetch must meet a confidence threshold. In this case the four consumer prefetches corresponding to load instructions LDR x6, [x5, #8]; LDR x7, [x5, #16]; LDR x4, [x5, #24]; and LDR x8, [x5, #32] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that the consumer prefetch corresponding to load instruction LDR x4, [x5, #24] hits in the producer pattern history table 66 and this prefetch is upgraded to a producer prefetch.

At step S503 the producer prefetch upgraded from the consumer prefetch corresponding to load instruction LDR x4, [x5, #24], as identified in step S502, is issued with depth counter=1. When the data associated with the producer prefetch corresponding to load instruction LDR x4, [x5, #24] is returned, the consumer prefetches associated with the producer prefetch can be issued. In this case, at step S506 it is determined that two consumer prefetches are issued. In this case the two consumer prefetches corresponding to load instructions LDR x3, [x4, #0]; and LDR x2 [x4, #8] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that both the consumer prefetch corresponding to load instruction LDR x3, [x4, #0] and the consumer prefetch corresponding to load instruction LDR x2 [x4,#8] hit in the producer pattern history table 66 and both these prefetches are upgraded to producer prefetches which are issued at step S507 and S509 respectively.

At step S507 the producer prefetch upgraded from the consumer prefetch corresponding to load instruction LDR x3, [x4, #0], as identified in step S506, is issued with depth counter=2. When the data associated with the producer prefetch corresponding to load instruction LDR x3, [x4, #0] is returned, the consumer prefetches associated with the producer prefetch can be issued. In this case, at step S508 it is determined that two consumer prefetches are issued. In this case the two consumer prefetches corresponding to load instructions LDR x5, [x3, #8]; and LDR x6 [x3, #0] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that neither of the consumer prefetches corresponding to load instruction LDR x3, [x4, #0] and the consumer prefetch corresponding to load instruction LDR x2 [x4,#8] hit in the producer pattern history table 66. Hence, neither prefetch is upgraded to a producer prefetch and no further prefetches are generated as a result of this step.

At step S509 the producer prefetch upgraded from the consumer prefetch corresponding to load instruction LDR x2, [x4, #8], as identified in step S506, is issued with depth counter=2. When the data associated with the producer prefetch corresponding to load instruction LDR x2, [x4, #8] is returned, the consumer prefetches associated with the producer prefetch can be issued. In this case, at step S508 it is determined that three consumer prefetches are issued. In this case the three consumer prefetches corresponding to load instructions LDR x6, [x2, #0]; LDR x7, [x2, #8]; and LDR x8 [x2, #16] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that none of the consumer prefetches corresponding to load instructions LDR x6, [x2, #0]; LDR x7, [x2, #8]; and LDR x8 [x2, #16] hit in the producer pattern history table 66. Hence, none of these prefetches are upgraded to a producer prefetch and no further prefetches are generated as a result of this step.

Figure 6:
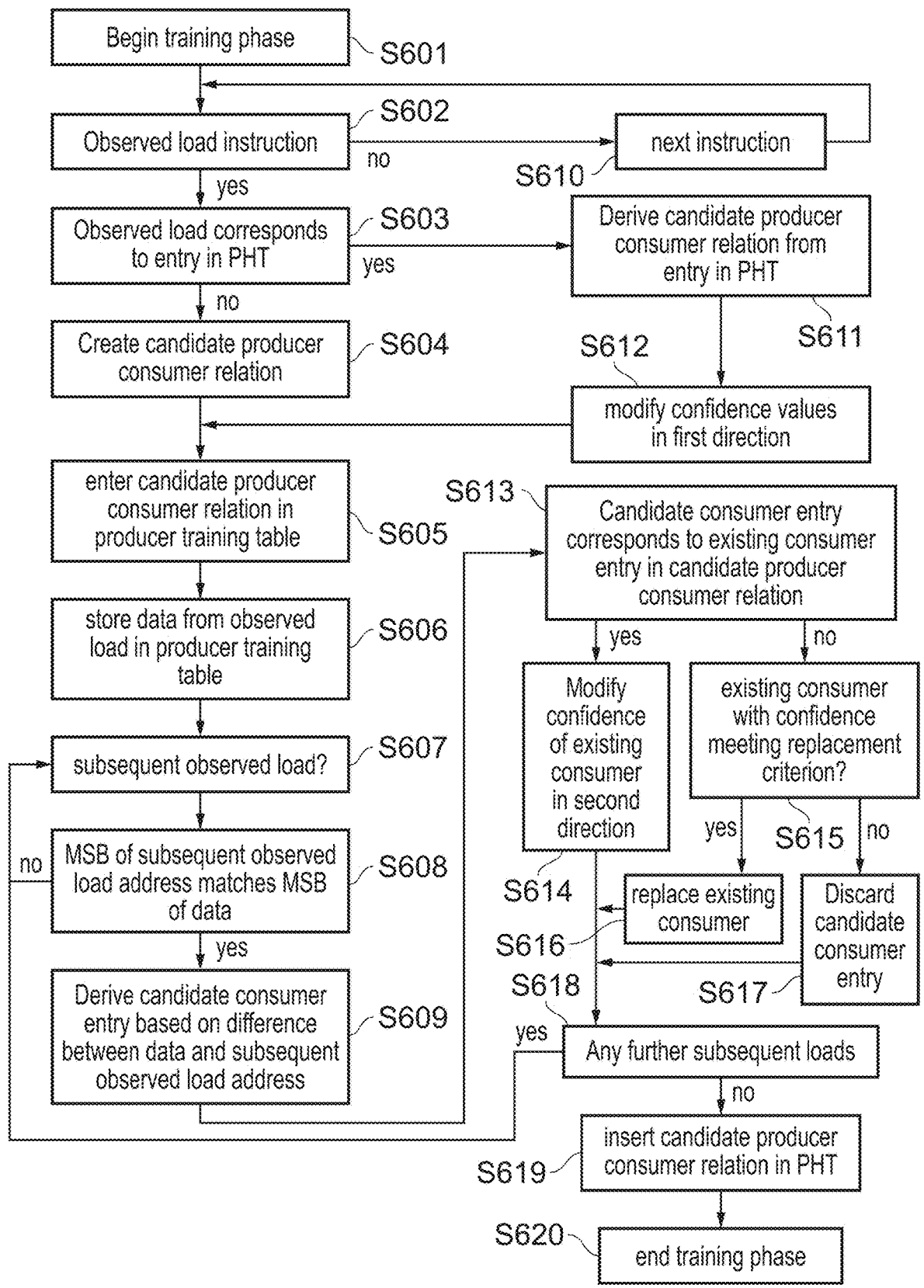
FIG. 6 illustrates a sequence of steps carried out during a training phase.

FIG. 6 illustrates a sequence of steps carried out by the data processing apparatus during a training phase with reference to the components set out in FIG. 2. Flow begins at step S601 where the data processing apparatus begins the training phase before flow proceeds to step S602. At step S602 it is determined whether a load instruction has been observed. If no then flow proceeds to step S610 where flow waits for the next instruction. If, at step S602, it is determined that a load instruction has been observed flow proceeds to step S603. At step S603 it is determined whether the observed load corresponds to an entry in the producer pattern history table 48. If yes then flow proceeds to step S611 where a candidate producer consumer relationship 56 is derived from the entry in the producer pattern history table 48. Flow then proceeds to step S612 where the confidence values, associated with the producer-consumer relationship 56 derived from the entry in the producer pattern history table 48, are modified in a first direction to indicate that confidence in the consumer identifiers associated with the candidate producer-consumer relationship is reduced. Flow then proceeds to step S605. If however, at step S603, it was determined that the observed load does not correspond to an entry in the producer pattern history table 48 then flow proceeds to step S604 where a candidate producer consumer relationship 56 is created based on the observed load before flow proceeds to step S605.

At step S605 the candidate producer-consumer relationship 56 that was either derived at step S611 or created at step S604 is entered into the producer training table 54 that is stored in the producer training table circuitry 52. Flow then proceeds to step S606 at which data returned in response to the observed load 58 is stored in the producer training table 54 that itself is stored in the producer training table circuitry 42. Flow then proceeds to step S607 where flow waits for a subsequent observed load. When a subsequent observed load is observed flow proceeds to step S608 where it is determined whether the most significant bit (MSB) of the subsequent observed load address matches the most significant bit of the data returned in response to the observed load 58. If, at step S608, there is not an observed match then flow returns to step S607 to wait for the next subsequent observed load. If however, at step S608, it is determined that there is a match then flow proceeds to step S609, where a candidate consumer entry is derived based on the difference between the data returned in response to the observed load 58 and the subsequent observed load address. Flow then proceeds to step S613 where it is determined whether the candidate consumer entry, derived in step S609, corresponds to an existing consumer entry in the candidate producer consumer relationship 56. If yes then flow proceeds to step S614 where the confidence value of the corresponding existing consumer is modified in a second direction to indicate that a confidence of observing the existing consumer subsequent to the producer load is increased. Flow then proceeds to step S618. If however, at step S613, it was determined that the candidate consumer entry does not correspond to any existing consumer entries in the candidate producer-consumer relationship 58 then flow proceeds to step S615. At step S615 it is determined whether there are any existing consumers with confidence values meeting the replacement criterion. If yes then flow proceeds to step S616 where the candidate consumer entry replaces the existing consumer entry before flow proceeds to step S618. If however, at step S615 it was determined that there are no existing consumer entries with confidence meeting the replacement criterion then flow proceeds to step S617 where the candidate consumer entry is discarded before flow proceeds to step S618. At step S618 it is determined whether there are any further subsequent loads to be observed. If yes then flow returns to step S607. If however, at step S618, it is determined that a sufficient number of subsequent loads have been observed then flow proceeds to step S619 where the candidate producer-consumer relationship 56 is inserted into the producer pattern history table 48 before flow proceeds to step S620 where the training phase ends.

Figure 7:
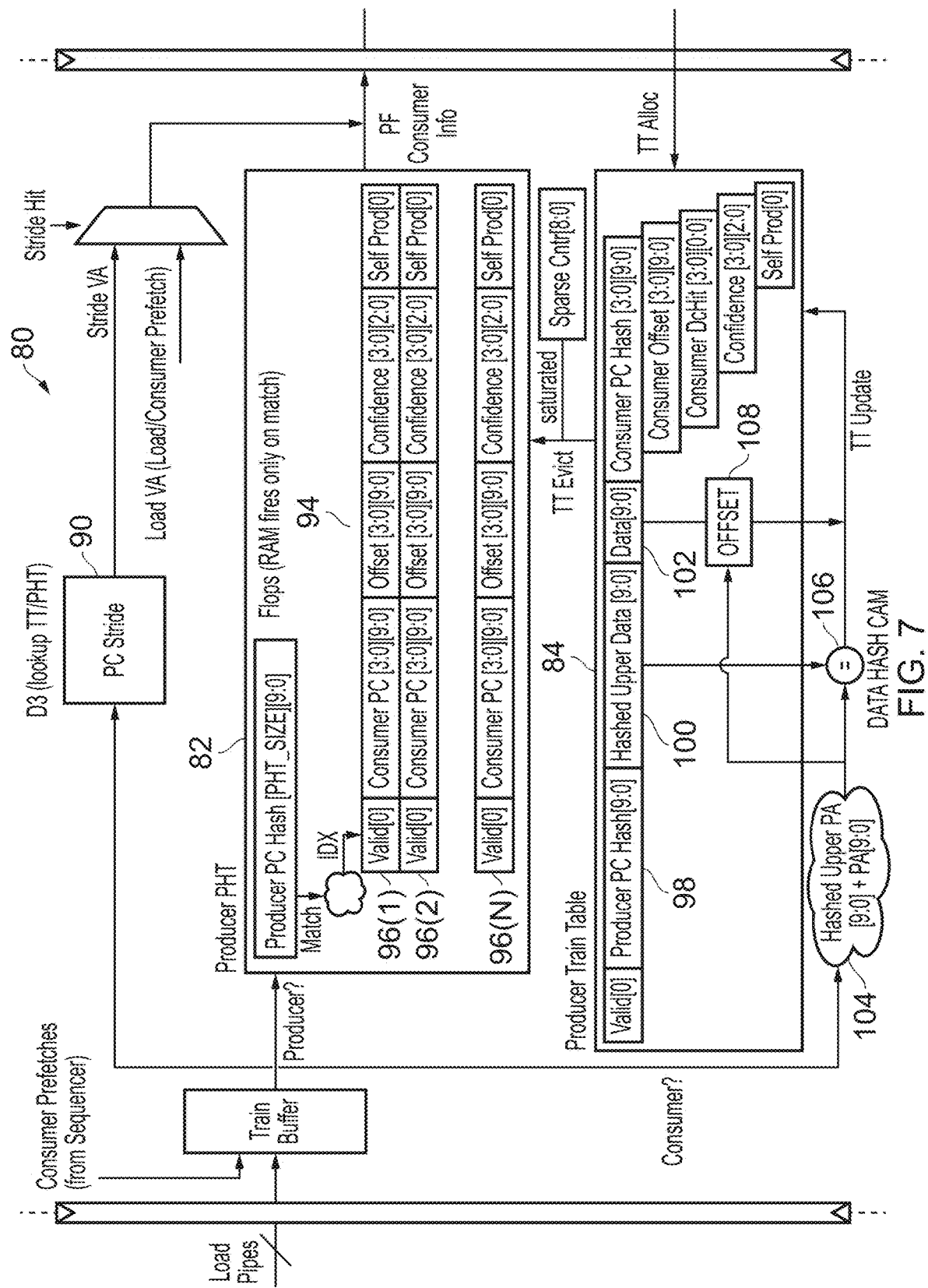
FIG. 7 schematically illustrates more details of a data processing apparatus.
Figure 7:
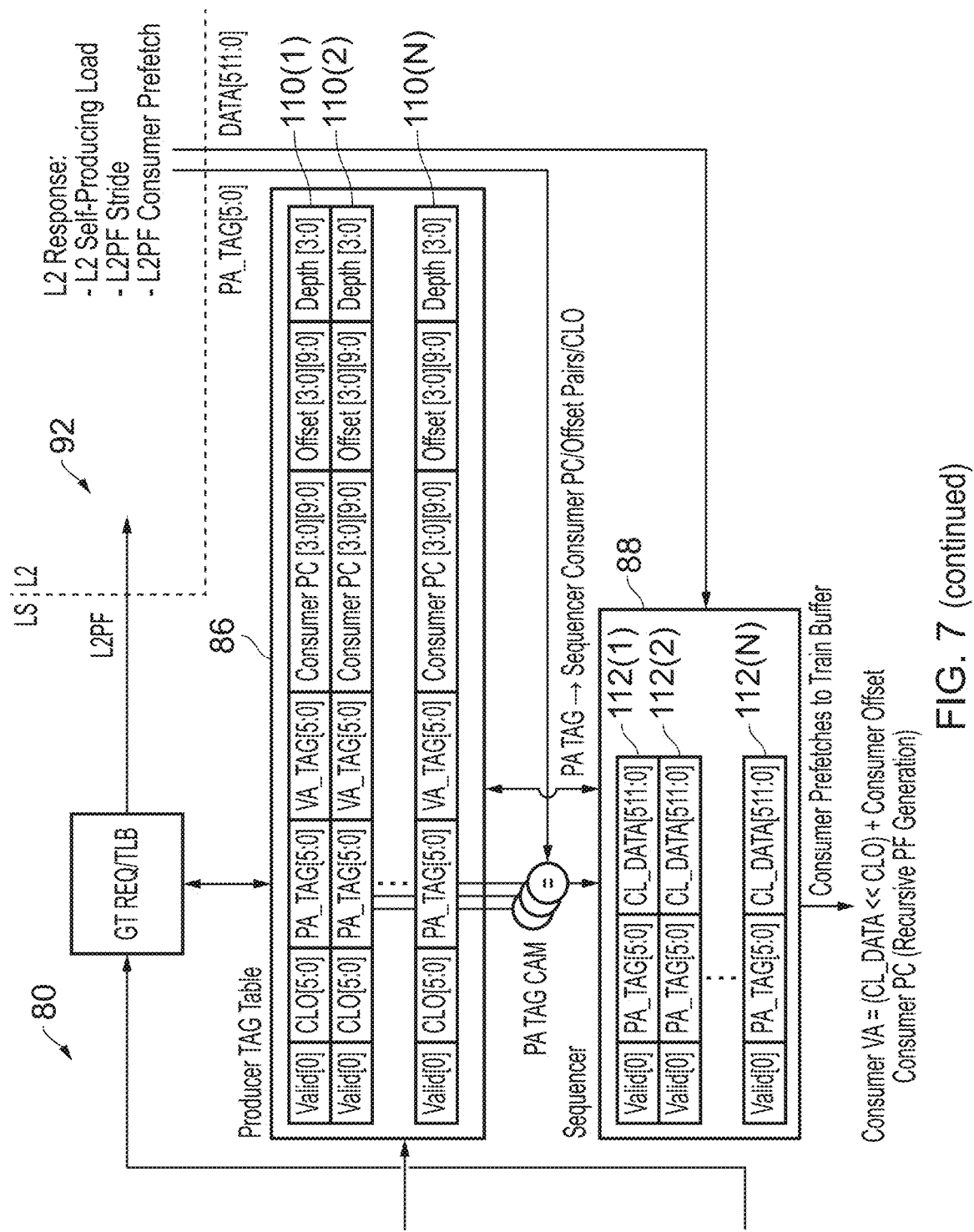

FIG. 7 illustrates a data processing apparatus according to some example configurations. Data processing apparatus 80 comprises producer pattern history table 82, producer training table 84, producer tag table 86, sequencer 88, stride prefetcher 90 and cache 92. Producer pattern history table 82 stores a plurality of producer-consumer relationships 92 which may be indexed by a producer indicator corresponding to a hash of the producer program counter value. The number of producer-consumer relationships 92 stored in the producer pattern history table 82 can be any number. For example, in some embodiments producer pattern history table 82 could store sixty four producer-consumer relationships 94. However, in other embodiments a greater or smaller number of producer-consumer relationships could be included. Each producer-consumer relationship 94 stores comprises a producer load indicator and a plurality of consumer entries 96. Any number of consumer entries could be provided in each producer-consumer relationship. A greater number of consumer entries provides allows the producer pattern history table 82 to store associations between a producer identifier and a greater number of consumer identifiers. However, in contrast, a greater number of consumer entries requires a greater circuit area and power consumption and may be of limited benefit for cases in which each producer load only has a small number of associated consumer loads. In some embodiments a balance between storing associations between producers and consumers is traded off against circuit area. In some embodiments each producer-consumer relationship comprises four entries. Each consumer entry 96 in the producer pattern history table comprises valid bits to indicate whether the entry is valid, a consumer program counter (PC) value to indicate a corresponding load instruction, an offset to be used to generate a consumer address based on data returned from a producer load, and a confidence value indicative of whether a previous load based on the corresponding consumer address was issued subsequent to the producer load.

The producer training table 84 is used during a training phase and stores a candidate producer-consumer relationship 98 which is derived in response to a load observed at the start of the training phase and, when the load observed at the start of the training phase corresponds to an entry in the producer pattern history table 82, is based on the corresponding entry in the producer pattern history table 82. Alternatively, when the load observed at the start of the training phase does not correspond to an entry in the producer pattern history table 82, the candidate producer consumer relationship 98 is a new entry based on the load observed at the start of the training phase. The candidate producer-consumer relationship 98 comprises valid bits, a producer program counter value which may be stored as a hashed value, upper bits of the data 100 returned from the load observed at the start of the training phase which may be stored as a hashed value, lower bits of data 102 returned from the load observed at the start of the training phase, and a plurality of consumer entries as described in relation to the producer-consumer relations stored in the producer pattern history table 82. As illustrated, during the training phase and in response to a subsequent observed load with a corresponding address, the upper bits of the corresponding address may be hashed and compared to the hashed upper bits of data 100 returned from the load observed at the start of the training phase. If a match is determined 106 then an offset 108 is derived based on a difference between the lower bits of data 102 returned from the load observed at the start of the training phase and the lower bits of the corresponding address. The offset 108 then forms part of a candidate consumer entry to be entered into the candidate producer-consumer relationship 98 according to the previously described logic. At the end of the training phase the candidate producer-consumer relationship may be entered into the producer pattern history table based on a replacement or eviction policy.

The producer tag table 86 stores a plurality of prefetch entries 110 defining in-flight prefetches. Each prefetch entry corresponding to a producer prefetch entry comprises a valid bit, a cache line offset (CLO) of the producer data, a physical address tag of the producer data, a virtual address tag of the producer data, data indicative of a plurality of consumer program counter values and corresponding offsets, and a depth counter. In addition, the producer tag table may store information indicative of consumer prefetch entries. In the case of consumer prefetches, there is no need for the producer tag table 86 to store, in association with the consumer prefetch entry, information indicative of further consumer prefetch entries. Producer prefetch entries 110 in the producer tag tale further comprise a prefetch identifier. A producer prefetch is entered into the producer tag table 86 if there are no existing entries in the producer tag table 86 that have a same address as the producer prefetch to be entered. When the producer prefetch to be entered does not have an address corresponding to an existing entry in the producer tag table the producer prefetch is entered into the table. When the address corresponding to the producer new entry matches a same cache line as an existing entry in the table, the new producer prefetch entry is given the same identifier as the existing entry. If however, the new producer prefetch entry does not match a cache line of an existing entry then the new producer prefetch entry is given a new prefetch identifier.

The sequencer 88 stores a plurality of entries 112 comprising a valid bit, a physical address tag of the producer data and data returned from the producer load. When an entry 112 reaches the head of the sequence buffer stored in the sequencer 88 the sequencer 88 references the information in the producer tag table 86 and the producer pattern history table 82 to generate the consumer prefetches based on the data returned from the producer prefetch. Once the consumer prefetches have been sent the corresponding entry in the producer tag table 86 is invalidated.

The stride prefetcher 90 is used to issue stride prefetches based on a predicted stride length. Because the stride prefetches necessarily correspond to data fetches ahead of the point that they would be fetched in program order, they are inherently timely and can be used to generate producer prefetches for which the data associated with the prefetch will return in time to generate the corresponding consumer prefetches.

Figure 8:
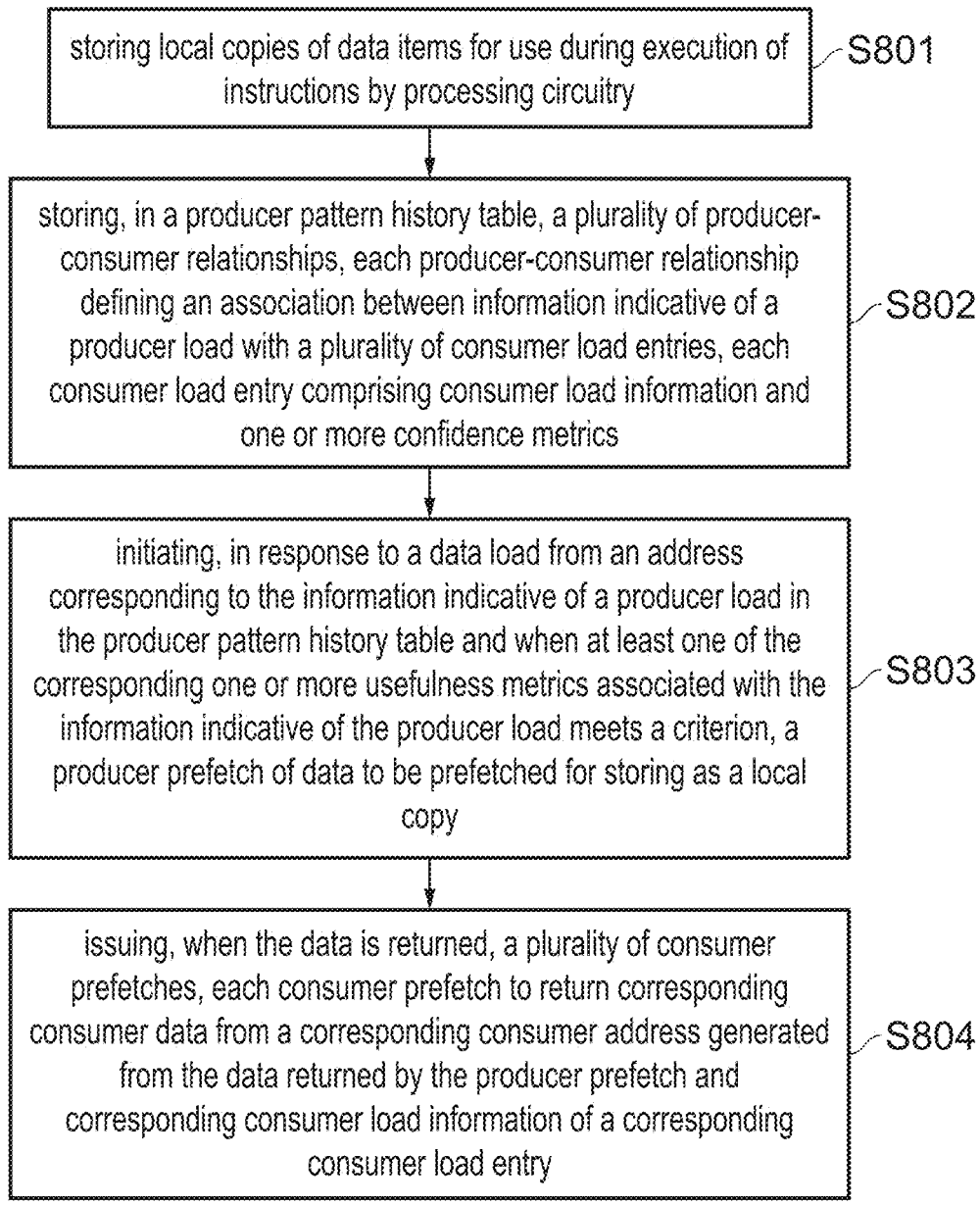
FIG. 8 illustrates a sequence of steps carried out.

FIG. 8 illustrates a sequence of steps carried out by the data processing apparatus in some example embodiments. At step S801 local copies of data items for use during execution of instructions by processing circuitry are stored. At step S802 a plurality of producer-consumer relationships are stored in a producer pattern history table, each producer-consumer relationship defining an association between producer load indicator and a plurality of consumer load entries, each consumer load entry comprising a consumer load indicator and one or more usefulness metrics. At step S803 a producer prefetch of data to be prefetched for storing as a local copy is initiated in response to a data load from an address corresponding to the producer load indicator in the producer pattern history table and when at least one of the corresponding one or more usefulness metrics associated with the producer load indicator meets a criterion. Finally, at step S804, when the data is returned, one or more consumer prefetches are issued, each consumer prefetch to return corresponding consumer data from a corresponding consumer address generated from the data returned by the producer prefetch and a corresponding consumer load indicator of a corresponding consumer load entry.

In brief overall summary data processing apparatuses and methods of processing data are disclosed. The operations comprise: storing copies of data items; and storing, in a producer pattern history table, a plurality of producer-consumer relationships, each defining an association between producer load indicator and a plurality of consumer load entries, each consumer load entry comprising a consumer load indicator and one or more usefulness metrics. Further steps comprise: initiating, in response to a data load from an address corresponding to the producer load indicator in the producer pattern history table and when at least one of the corresponding one or more usefulness meets a criterion, a producer prefetch of data to be prefetched for storing as a local copy; and issuing, when the data is returned, one or more consumer prefetches to return consumer data from a consumer address generated from the data returned by the producer prefetch and a consumer load indicator of a consumer load entry.

Specific Examples of Replacement Policy Control for Candidate Producer-Consumer Relationships Based on Producer-Data-Consumer-Operand-Match-Based Replacement Policy Criterion Indirect prefetching based on relations between producer loads and consumer loads as discussed above can be useful in workloads where a consumer load uses data loaded by a producer load to form its address. The training approach discussed above learns these relationships by comparing the consumer address of a consumer load and the producer data loaded by a producer load, and recording the offset between the producer data and consumer address for use in generating subsequent prefetches. However, as shown in FIG. 9, sometimes this may cause a load being predicted to be the consumer of the producer data from an earlier producer load, even though there is no true dependency between the data loaded by the producer load and the address of the subsequent load.

Figure 9:
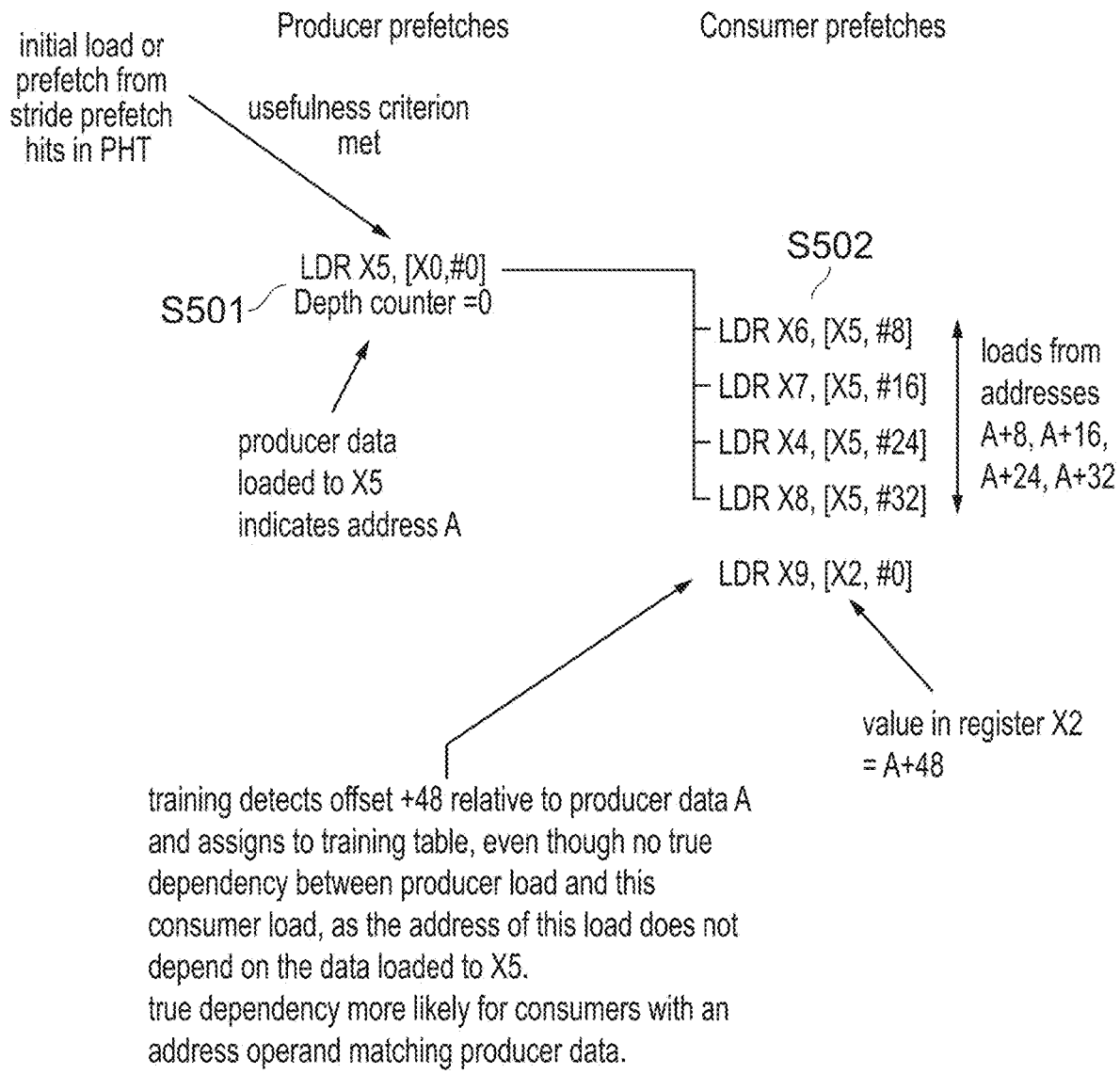
FIG. 9 illustrates an example of the prefetcher detecting a producer-consumer relationship for a consumer load which does not have a true dependency on the producer load.

FIG. 9 shows, for sake of example, the producer and consumer prefetches shown in steps S501 and S502 of FIG. 5. Based on the producer load at step S501 which loads a certain data value "A", four consumer loads are detected as specifying addresses A+8, A+16, A+24, A+32 with relatively small offsets from the producer data, and so the training table can records these offsets +8, +16, +24, +32 to allow consumer prefetches to be initiated the next time the producer load (or a corresponding prefetch request) is generated. For the four consumer loads with addresses A+8 to A+32, the consumer loads do have a true dependency on the producer load, since they all specify for their base address operand the value 'A' which was loaded by the producer load (in this example, the four consumer loads specify as the base address register a register X5 which was the destination register of the producer load, but other examples could move the producer data to a different register before being referenced as the base address operand by the consumer loads).

However, as shown in FIG. 9, a subsequent load LDR X9, [X2, #0] may also be present which is independent of the producer data, since its address operands comprise a base address operand specified using register X2 and an offset operand which in this example is an immediate value of #0. However, if the value in register X2 happens to be relatively close to the producer data A, e.g. A+48 in this example, the training circuitry 50 described above may assume that this load is another consumer of the pointer loaded by the producer load, and may record the offset +48 in the training table 54 which may subsequently gain enough confidence to be promoted to the producer pattern history table 48 and used for generating consumer prefetches by the prefetch generation circuitry 46. For a time, such consumer prefetches can be useful, as even though there is no true dependency of the load from address A+48 on the producer data loaded by the producer load, correct predictions of the load from address A+48 can still be generated. However, for the load not having the true dependency on the producer load, there is a risk that objects referenced by the program code could be reallocated in the memory address space, so that after the reallocation this load LDR X9, [X2, #0] no longer specifies an address offset from the producer data by the offset of 48, causing subsequent prefetches to be incorrect. The producer-consumer relationship between the producer load and the 'false' consumer load has occupied space in the training table 54 which could otherwise have been used for another producer-consumer relationship which might be more useful to retain in the long-term.

A way to distinguish the consumer loads which have the true dependency can be to compare one of the address operands of the consumer load with the producer data loaded by the producer load. If the address operand matches the producer data, it is much more likely that there is a true pointer relationship or other dependency between the producer data and the consumer target address. For example, in the example of FIG. 9 the "true" dependent consumer loads all have the base address operand 'A' matching the producer data, while the "false" consumer load does not (its base address operand is 'A+48', not 'A'). One might therefore think that any consumers not having an address operand matching the producer data could therefore be excluded from being allocated to the training table.

However, as mentioned above, for a time such "false" consumers can still allow useful prefetches to be generated, as if there is no reallocation of memory address space, the false relation between the producer data and the consumer address continues to hold. Hence, if there are no more useful relationships relating to true dependent consumer loads then it can be beneficial to continue to train based on those false relationships.

Figure 10:
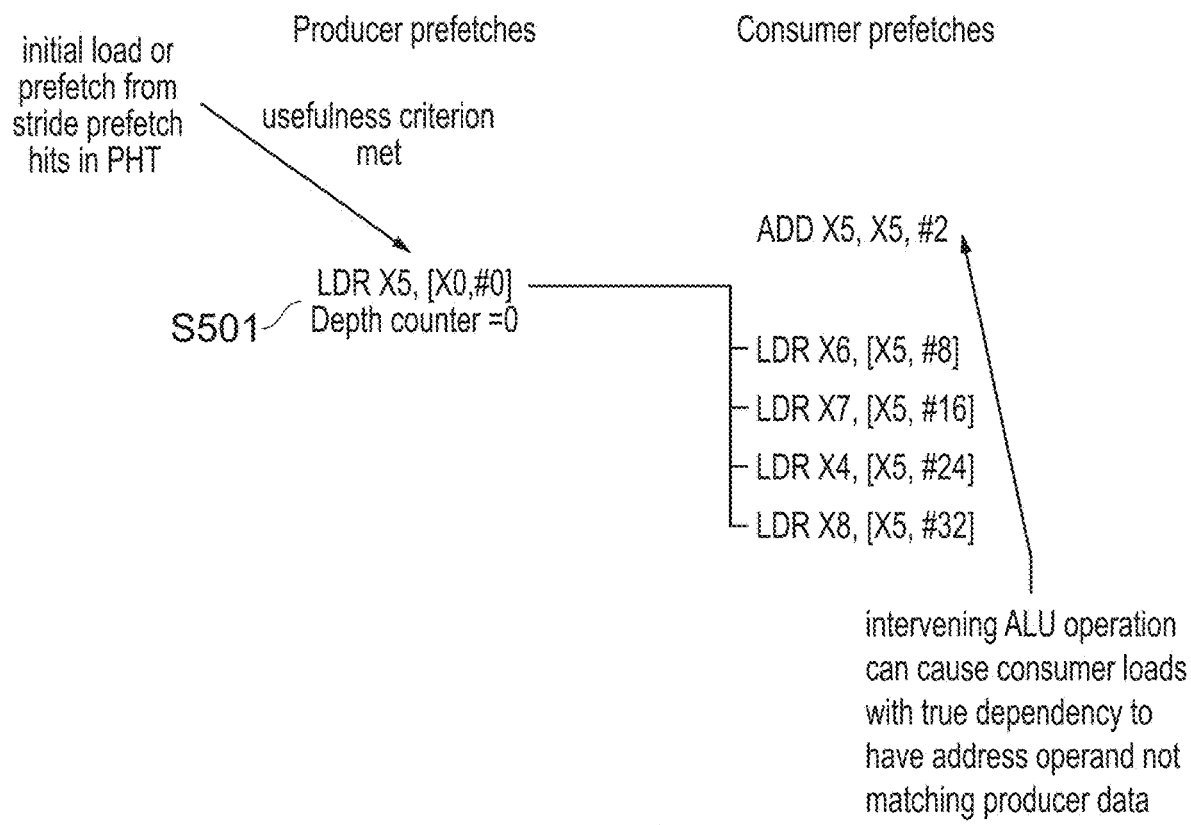
FIG. 10 illustrates an example of an intervening ALU operation causing an address operand of a consumer load which does have a true dependency on the producer load to differ from the producer data of the producer load.

Also, as shown in FIG. 10, even for the true consumers which have a dependency on the producer load, it is possible that an intervening arithmetic or logical operation can cause the consumer loads having the true dependency to have the address operand not matching the producer data. For example, in FIG. 10 an add instruction is executed between the producer load and the consumer loads which causes the base address operands of the consumers to no longer match the producer data, but nevertheless there is a true chain of dependency between the producer load and the consumer loads and so it would be desirable to still be able to generate consumer prefetches in this scenario. Therefore, it is not desirable to suppress allocation of producer-consumer relationships to a training table altogether for consumers where the address operand of the consumer does not match the producer data.

Instead, an approach is taken where the matching of an address operand with the producer data may be taken into account for controlling replacement policy in the producer training table 54, so as to bias the replacement policy towards retaining more entries for consumers which have an address operand matching the producer data. In the example of FIGS. 9 and 10, the address operand to match against the producer data is the base address operand of the consumer loads, but other prefetchers could detect the match condition based on matching the offset operand against the producer data (this could be useful for workloads which use the producer data as an offset relative to a separately specified base address).

Figure 11:
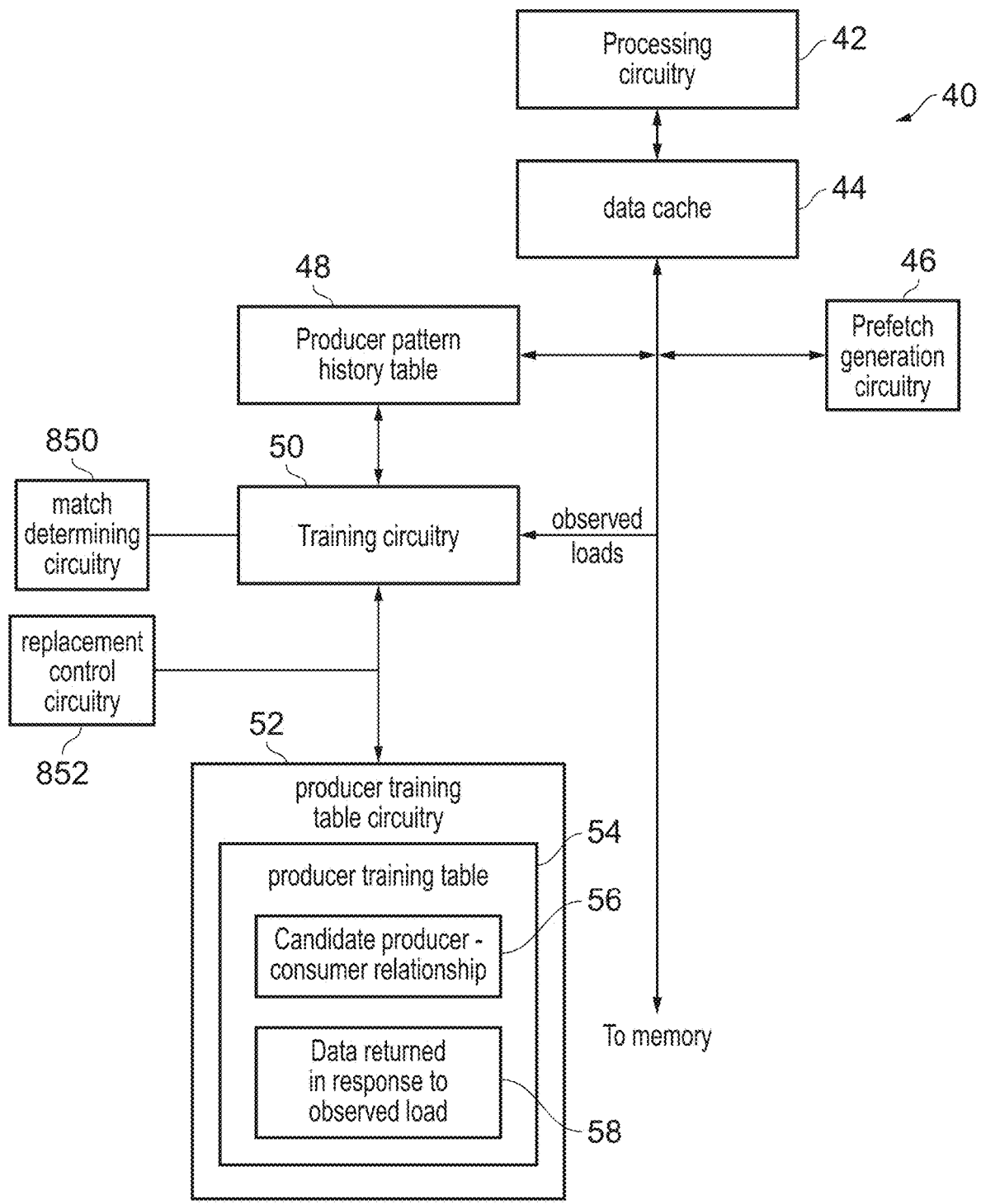
FIG. 11 illustrates an example of a data processing apparatus having match determining circuitry and replacement control circuitry.

FIG. 11 shows an example of an apparatus 40 which controls for controlling replacement of training entries in this way. The apparatus in the example of FIG. 11 is the same as shown in FIG. 2, but has some additional elements. Most of the components of the apparatus shown in FIG. 10 are the same as the correspondingly numbered features shown in FIG. 2 discussed earlier. The apparatus of FIG. 11 can also have any of the other features discussed above for the examples of FIGS. 1 to 8, even if not explicitly shown.

In addition, the apparatus 40 has match determining circuitry 850 for determining, for a particular candidate producer-consumer relationship 56 to be allocated to the producer training table 54, whether a producer-data-consumer-operand (PD-CO) match condition is satisfied. The PD-CO match condition is satisfied in the case where an address operand of the consumer load corresponding to that candidate producer-consumer relationship 56 matches the producer data of the corresponding producer load. The apparatus 40 also has replacement control circuitry 852 for controlling replacement of candidate producer-consumer relationships 56 in the producer training table 54. The replacement control circuitry 852 controls the replacement of an existing entry with a new entry based on a hierarchy of replacement policy criteria, which includes at least a PD-CO-match-based replacement policy criterion which depends on whether the PD-CO match condition is satisfied for the new entry to be allocated and/or one or more existing entries capable of being replaced with new entry.

Figure 12:
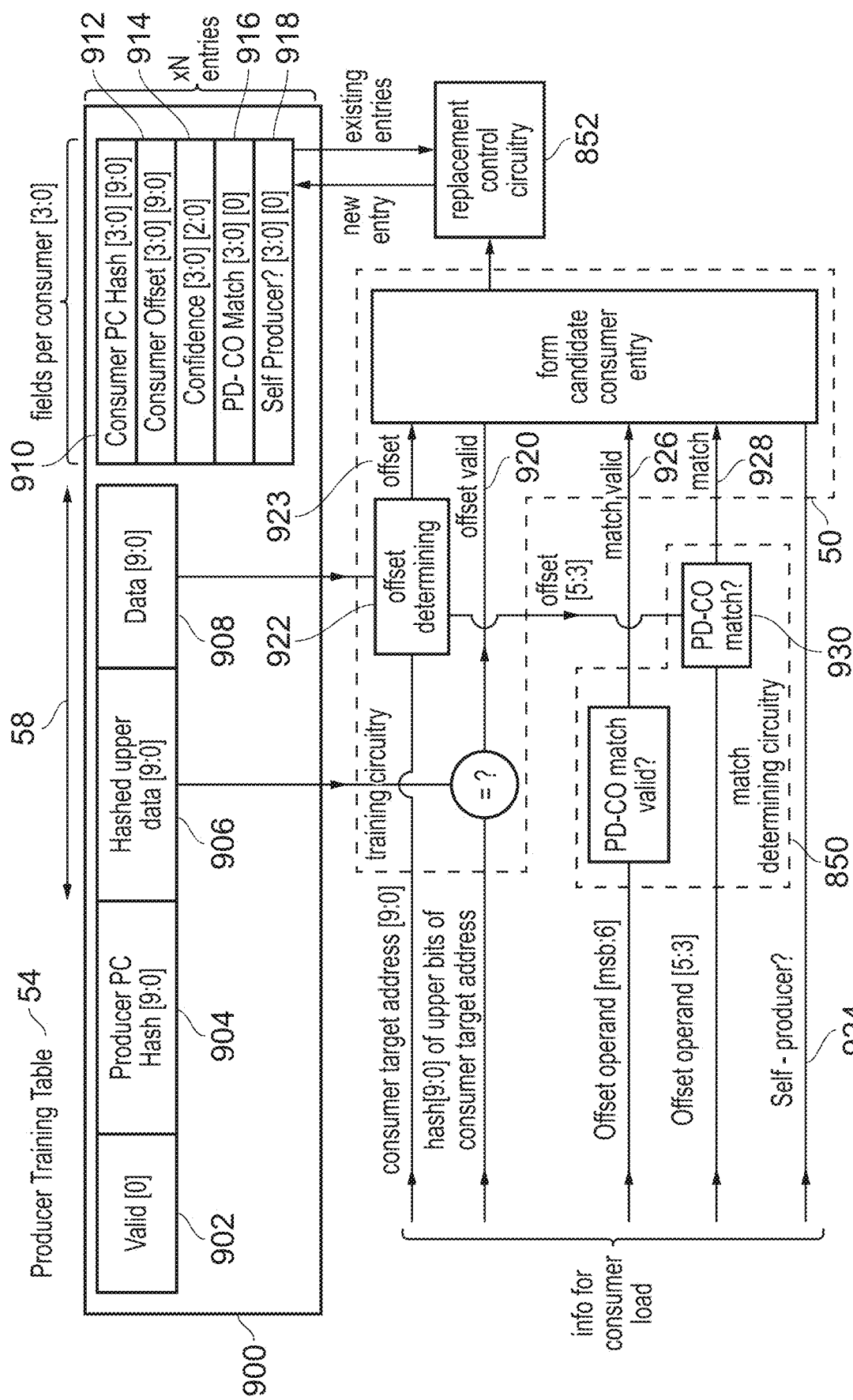
FIG. 12 illustrates a more detailed view of portions of the apparatus of FIG. 11 for controlling training and replacement of trained candidate producer-consumer relationships.

FIG. 12 shows in more detail a portion of the apparatus 40 of FIG. 11. FIG. 12 shows a single training entry 900 of the producer training table 54. The training table 54 has a certain number N of such training entries 900. A given training entry 900 includes:

- a valid bit 902 specifying whether the training entry 900 is valid.
- a producer load indication 904 of the instruction address (program counter, PC) of the corresponding producer load. In this example, to save circuit area, the producer load indication is a hash of the producer load's PC, the hash having fewer bits than the PC itself.
- the producer data 58 loaded in response to the producer load. In this example, to save circuit area, the upper bits of the producer data are hashed to a reduced-size hash value 906, while the lower bits 908 are recorded as in the original producer data. It will be appreciated that other examples could store the producer data in a different representation.
- A certain number (in this example, 4) of consumer entries relating to respective consumer loads indicated as having a producer-consumer relation with the producer load. The consumer entries can be seen as representing a different producer-consumer relationship involving the same producer load but different consumer loads. Each consumer entry includes:
  - a consumer load indication 910 indicating the instruction address (PC) of the consumer load, which again in this example is hashed to reduce the number of stored bits.
  - The consumer offset 912 indicating the difference between the consumer target address of the consumer load and the producer data 58 loaded by the producer load. To limit complexity, the consumer offset may be restricted to a certain number of bits (10 in this example), and so consumers with a true dependency on the producer load which have an offset too large to be represented with that number of bits may not be detected as having a producer-consumer relationship. In practice, producer-consumer relations are more common with a relatively small offset, so it may not be worth expending circuit area on supporting larger consumer offsets.
  - A usefulness value 914 (which in this example is a confidence value expressing a level of confidence in an address prediction for the consumer load based on the consumer offset field 912 being correct, but other examples could specify the usefulness value as a timeliness value which expresses the likelihood that the consumer prefetch can be initiated in time to allow the corresponding consumer data to be cached before the corresponding consumer load is issued by the processing circuitry 42, or could express usefulness as a combination of confidence and timeliness). In some examples, confidence indications 914 for each of the consumer entries in existing training entries 900 may be aged (confidence level decreased) over time, for example by decreasing the confidence each time a new allocation of a new training entry 900 into the training table 54 is made for a new producer load. This allows old predictions which were successful for a time but are no longer useful (e.g. because the corresponding producer/consumer load pair is not encountered again) to be replaced.
  - A PD-CO match indication 916 indicating whether the PD-CO match condition is satisfied for the consumer load. The PD-CO match condition is satisfied if an address operand (in this particular example, the base address operand) of the consumer load is determined by the match determining circuitry 850 to match the producer data of the producer load.

A self-producer indication 918 indicating whether a self-producer condition is satisfied for the consumer load. The self-producer condition is satisfied if looking up the PC of the consumer load in the producer training table 54 or the pattern history table 48 detects a hit against another entry, so that the consumer load can serve as the producer prefetch for a further set of consumer prefetches generated in a recursive chain as mentioned earlier.

The notation [3:0][9:0] shown in FIG. 12 indicates that a field of 10 bits [9:0] is provided for four separate consumers identified with consumer IDs 0, 1, 2, and 3 respectively, so that the consumer offset field [3][9:0] would specify the consumer offset for consumer number 3. It will be appreciated that the particular number of consumer entries provided per training entry 900 and the particular number of bits provided for the different fields in the training entry 900 shown in FIG. 12 are just one example, and other examples may vary the number of consumers per training entry 900 and the number of bits in a particular field.

FIG. 12 illustrates a portion of the training circuitry 50, match determining circuitry 850 and replacement control circuitry 852 for performing training and replacement of consumer entries. After a given producer load has been encountered and allocated to a particular training entry 900, the training circuitry 50 monitors subsequent loads to check if they have a producer-consumer relationship.

The lower part of FIG. 12 shows how the training circuitry can form the candidate consumer entry to be allocated for one of these subsequent load. The training circuitry 50 compares a hash derived from upper bits of the consumer target address against the hash 906 of the upper bits of producer data stored in the training entry 900, and generates an offset valid signal 920 which serves to signal whether the candidate consumer entry will be valid. If the hashes of the upper bits of the consumer target address and the producer data do not match then the candidate consumer entry will be invalid and is prevented from being allocated into the training entry 900 as a new consumer entry. Meanwhile, offset determining circuitry 922 of the training circuitry 50 determines an offset between the lower bits 908 of the producer data and the lower bits of the consumer target address, and in the case where the comparison of the upper bit hashes is found to be valid then this offset will become the consumer offset field 912 of the new candidate consumer entry. The training circuitry also receives a self-producer indication 924 indicating whether the consumer is itself a producer, based on a signal indicating whether looking up the consumer PC in the producer training table 54 and/or producer pattern history table 48 detects a hit.

The match determining circuitry 850 determines whether the PD-CO match condition is satisfied based on a comparison of the offset operand of the consumer load with the consumer offset 923 generated by the offset determining circuitry 922. This can generate a match condition equivalent to detecting a match between the base address operand of the consumer load and the producer data 58, but is more efficient than comparing the base address operand itself, because the offset requires fewer bits to be compared.

In practice, the comparison performed by the match determining circuitry 850 also does not need to compare the full number of bits of the offset operand and consumer offset 923. The match determining circuitry 850 receives the offset operand of the consumer load and determines from a certain portion of upper bits (in this example, bits [msb:6], where msb is the most significant bit of the offset) whether the magnitude of the offset operand is greater than a threshold value. For example, the magnitude of the offset operand may be considered less than the threshold value when all of the upper bits are sign bits (0 for a positive value, 1 for a negative value). The match determining circuitry 850 determines a match valid signal 926 which indicates whether the match condition result 928 indicated for this consumer load is valid. The match condition result 928 will be indicated as invalid in the case when the magnitude of the offset operand is greater than a threshold value. If the match condition result is invalid then the consumers treated in the same way as if the match condition was not satisfied. By checking for validity of the match condition determination and limiting the offset to a certain maximum value in order for the match condition to be valid, this means that an offset comparator 930 in the match determining circuitry 850 can be made smaller because it does not need to check the upper bits [msb:6] of the offset operand. Other examples could omit the PD-CO match validity checking and compare a greater number of bits of the offset operand and consumer offset 923.

Also, a number of lower bits of the offset operand of the consumer load and the consumer offsets 923 determined from the producer data and the consumer target address can be ignored for the comparison performed by comparator 930 for evaluating the match condition result 928. This is because it is very common that the lower bits of an address pointer loaded from memory will all be zero. Hence, in this example, the match condition result 928 is determined by comparing bits [5:3] of the offset operand with bits [5:3] of the consumer offset 923 derived from the difference between the consumer target address and the producer data 58. If these bits match, then the PD-CO match condition is determined to be satisfied, as indicated by the match condition result 928.

In practice, this match condition result 928 is an approximate one and can have some false positive match detections of the PD-CO match condition being satisfied, both due to the hashing applied to the upper bits of the producer data 58 and consumer target address, and due to ignoring the lower bits [2:0] of the offsets which may lead to a false positive in cases where for an address pointer has a non-zero bit at the lower bit positions. These false positives are expected to be rare and overall the balance between circuit complexity and performance is improved by using the hashing and excluding the lower bits from the comparison performed by the PD-CO match comparator 930.

The training circuitry 50 forms the candidate consumer entry awaiting allocation as a new consumer entry into the training entry 900 based on the information derived for the new consumer load. If the training circuitry determined that the offset valid signal 920 indicates mismatching hashes of the upper bits of the producer data and consumer target address, the new consumer entry is invalid and is simply discarded.

If a hash of the PC of the consumer load matches the consumer PC hash 910 of an existing consumer entry in the training entry 900 and the consumer offset 912 in that existing consumer entry corresponds to the calculated offset 923 derived from the producer data and the consumer target address, the training circuitry 50 increases the level of confidence expressed by the usefulness indication 914. The new consumer entry can be discarded (or is never formed), without allocating a new entry into the training table.

If the offset valid signal 920 indicates that the new consumer load has a valid offset, and, for each existing consumer entry, either the hash of the PC of the subsequent load does not match the consumer PC hash 910 of that existing consumer entry or the calculated offset 923 does not match the consumer offset 912 of that existing consumer entry (or both PC and offset mismatch), then a new entry can be allocated for the new consumer load, provided the replacement control circuitry 852 determines that a replacement condition is satisfied. For that new entry, the consumer offset 912 is set equal to the determined offset 923, the confidence value or other usefulness value 914 is set to an initial state (e.g. a state expressing the lowest level of confidence, or some other starting level of confidence), the self-producer field 918 is set based on the self-producer signal 924, and the PD-CO match indication 916 is set to indicate that the PD-CO match condition is satisfied if both the match valid signal 926 indicates that the PD-CO match condition result 928 is valid and the PD-CO match condition result 928 indicates that the comparison of the offset operand and the consumer offset performed by comparator 930 detected a match. For example, the PD-CO match field 916 may be set based on the logical AND of the match valid and match condition result signals 926, 928.

The replacement control circuitry uses the information specified in the existing consumer entries already present in the training entry 900 and the information specified for the new consumer entry awaiting allocation, to determine whether to allocate the new consumer entry at all, and if so, which existing consumer entry to replace.

Figure 13:
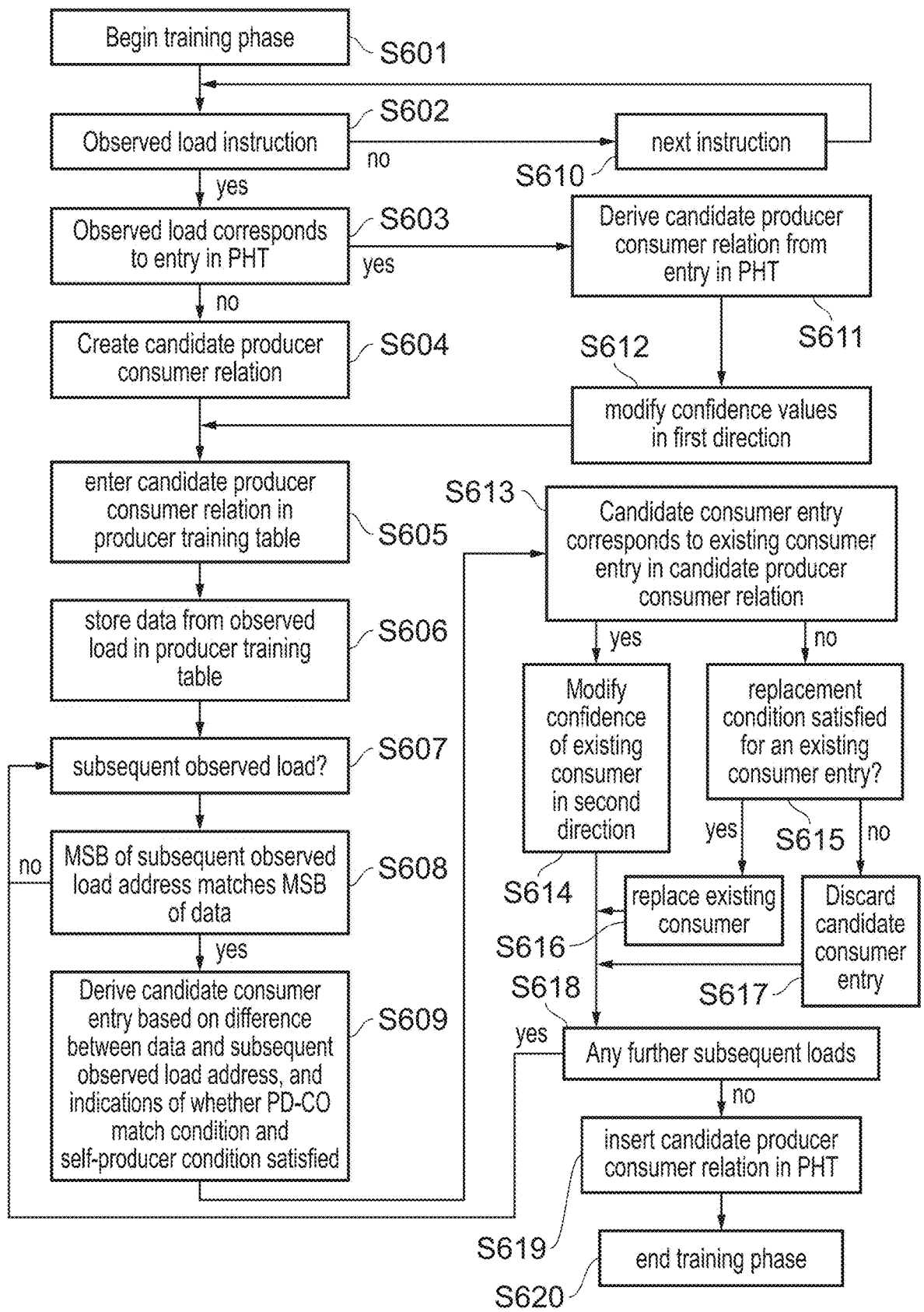
FIG. 13 shows a sequence of steps carried out during a training phase in the example of FIG. 11.
Figure 14:
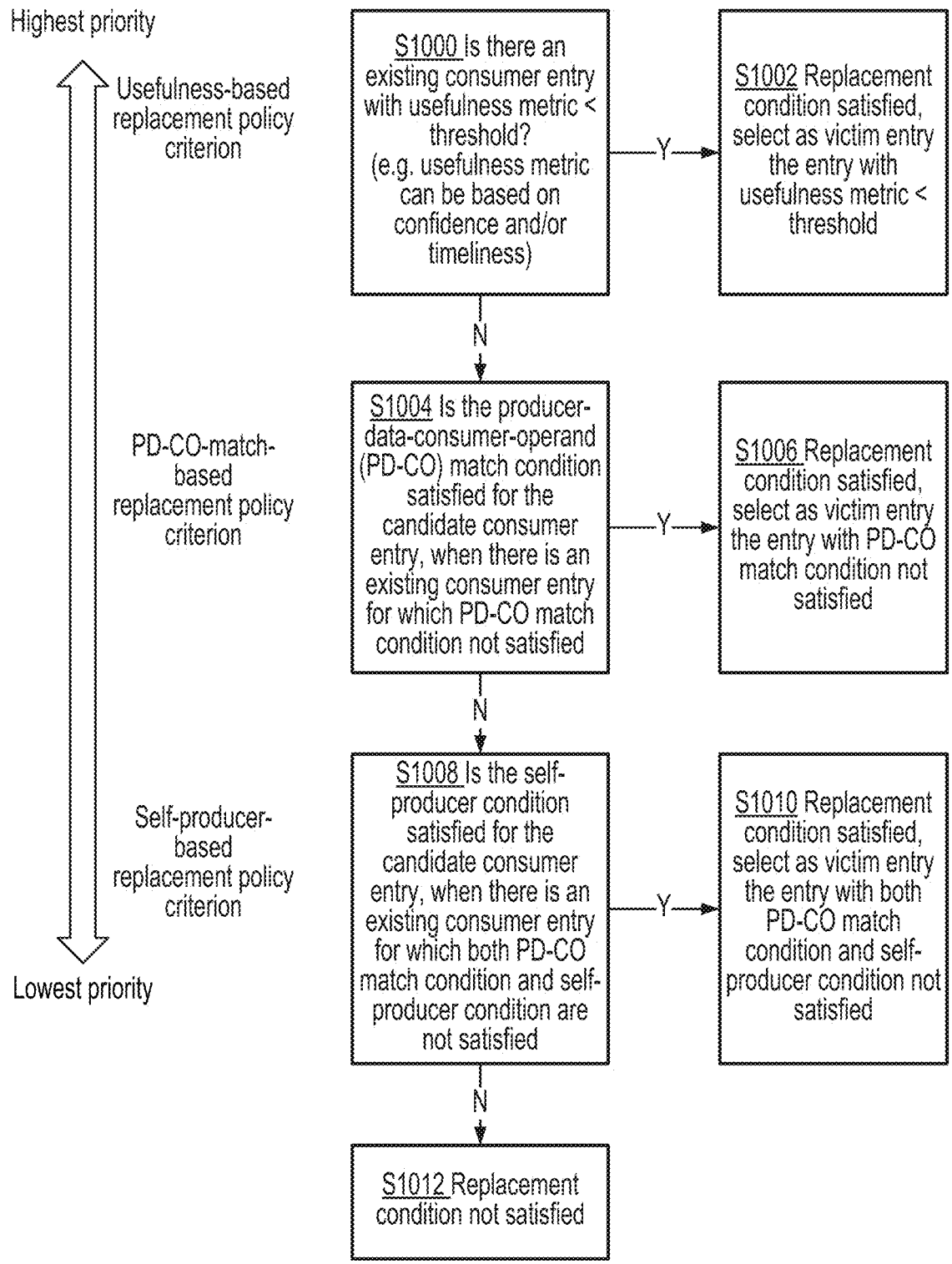
FIG. 14 shows steps for determining whether a replacement condition is satisfied for an existing consumer entry.

The replacement policy used is described in more detail with respect to FIGS. 13 and 14. FIG. 13 illustrates the training process for training producer-consumer relationships in the apparatus of FIG. 11. FIG. 13 is the same as FIG. 6, except that:
- at step S609, the candidate consumer entry is derived not only based on the difference between the producer data and the subsequent observed load address, but also based on the indications of whether the PD-CO match condition and the self-producer condition are satisfied as described above with respect to FIG. 12
- at step S615, the condition required to be satisfied for the candidate consumer entry to replace an existing consumer entry is a replacement condition, evaluated as discussed below for FIG. 14, rather than merely a confidence condition; and
- (optionally—in other examples step S619 may still be as shown in FIG. 6)) at step S619 the insertion of the candidate producer-consumer relation into the PHT may be conditional on the candidate producer consumer relation meeting a promotion condition, such as a condition depending on the usefulness indications 914 of the respective consumers in that candidate producer consumer relation, or a condition depending on a certain period of training having elapsed.

FIG. 14 shows in more detail the evaluation of whether the replacement condition is satisfied at step S615 of FIG. 13. At step S1000, the replacement control circuitry 852 determines whether there is an existing consumer entry in the candidate producer consumer relation represented by the currently processed training entry 900, which has the usefulness metric 914 indicating less than a threshold level of usefulness (as noted above, usefulness metric can depend on confidence and/or timeliness). If there is an existing entry with the usefulness metric indicating a level of usefulness less than the threshold, then at step S1002 the replacement condition is determined to be satisfied and the victim entry selected for replacement is the entry with the usefulness metric indicating the level of usefulness less than the threshold. If there are multiple entries with a level of usefulness less than the threshold, then any one of these entries can be selected (e.g. at random, or using a least recently used policy or other replacement policy).

If there is no existing consumer entry with the usefulness metric indicating a level of usefulness less than the threshold, then at step S1004 the replacement control circuitry 852 determines whether the PD-CO match condition is satisfied for the new candidate consumer entry to be allocated into the training entry 900, when there is an existing consumer entry for which the PD-CO match indication 916 specifies that the PD-CO match condition is not satisfied. If so, then at step S1006 the replacement condition is again considered satisfied, and the replacement control circuitry 852 selects as the victim entry to be replaced the existing consumer entry with the PD-CO match condition not satisfied. If there are multiple entries with the PD-CO match condition not satisfied, then any one of these entries can be selected (e.g. at random, or using a least recently used policy or other replacement policy).

If it was determined at step S1004 that the new candidate consumer entry does not have the PD-CO match condition satisfied, or all of the existing entries have the PD-CO match condition satisfied, then at step S1008 the replacement control circuitry 852 determines whether the self-producer condition is satisfied for the new candidate consumer entry, when there is an existing consumer entry for which both the PD-CO match condition and the self-producer condition are not satisfied. This is determined based on the PD-CO match indication 916 and self-producer indication 918 of each existing consumer entry in the training entry 900. If there is an existing entry with the PD-CO match condition and self-producer condition both not satisfied but the new candidate consumer entry does have the self-producer condition satisfied, then at step S1010 the replacement condition is again considered satisfied, and this time the victim entry is selected as the entry with both the PD-CO match condition and the self-producer condition not satisfied (again with a random or other selection made in the case when multiple existing entries have the self-producer condition not satisfied).

If it was determined at step S1008 that the new candidate consumer entry does not have the self-producer condition satisfied, or all of the existing entries have at least one of the PD-CO match condition and the self-producer match condition satisfied, then at step S1012 the replacement control circuitry 852 determines that the replacement condition is not satisfied and so this will cause the new candidate consumer entry to be discarded at step S617 of FIG. 13.

Hence, as shown in FIG. 14 the replacement control circuitry 852 implements a hierarchy of replacement policy criteria, with the usefulness-based replacement policy criterion at step S1000 having the highest priority, the PD-CO-match-based replacement policy criterion at step S1004 having the second highest priority, and the self-producer-based replacement policy criterion having the lowest priority. It will be appreciated that other replacement policy criteria could also be included in the hierarchy. The hierarchy means that if there is a "useless" existing consumer entry having a usefulness metric indicating level of usefulness less than the threshold, then that entry will be prioritised for eviction and replaced with the new entry. However, a "useful" existing consumer entry is allowed to be replaced with a new entry in the case where it does not satisfy the PD-CO-match condition but the new entry does satisfy the PD-CO-match condition. This will tend to cause consumer entries which correspond to consumer loads with a false dependency on the producer load as shown in the example of FIG. 9 to eventually be evicted from the table, to conserve limited training resources for other consumer loads with a true dependency which are more likely to provide a longer-term benefit for controlling initiation of consumer prefetches by the prefetch generation circuitry 46.

Code for Fabrication of Apparatus

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
prefetch generation circuitry to generate requests to prefetch data to a cache, where the prefetch generation circuitry is configured to initiate a producer prefetch to request return of producer data having a producer address and to initiate at least one consumer prefetch to request prefetching of consumer data to the cache, the consumer data having an address derived from the producer data returned in response to the producer prefetch;
training circuitry to update, based on executed load operations, a training table indicative of a plurality of candidate producer-consumer relationships being trained for use by the prefetch generation circuitry in generating the producer prefetch and the consumer prefetch;
match determining circuitry to determine, for a given candidate producer-consumer relationship between a given producer load and a given consumer load, whether the given candidate producer-consumer relationship satisfies a producer-data-consumer-operand (PD-CO) match condition indicative of the producer data of the given producer load matching an address operand of the given consumer load; and
replacement control circuitry to control, based on at least one replacement policy criterion, replacement of an existing candidate producer-consumer relationship indicated in the training table with a new candidate producer-consumer relationship; in which:
said at least one replacement policy criterion includes a PD-CO-match-based replacement policy criterion depending on whether the PD-CO match condition is satisfied for at least one of:
the new candidate producer-consumer relationship, and one or more existing candidate producer-consumer relationships capable of being replaced with the new candidate producer-consumer relationship.

2. The apparatus according to claim 1, in which the replacement control circuitry is configured to control the replacement based on a hierarchy of replacement policy criteria, with a higher-priority replacement policy criterion taking preference over a lower-priority replacement policy criterion.

3. The apparatus according to claim 2, in which the replacement control circuitry is configured to select for replacement an existing candidate producer-consumer relationship that satisfies the higher-priority replacement policy criterion in preference to an existing candidate producer-consumer relationship that satisfies the lower-priority replacement policy criterion.

4. The apparatus according to claim 2, in which the PD-CO-match-based replacement policy criterion is a replacement policy criterion other than a highest-priority replacement policy criterion in the hierarchy.

5. The apparatus according to claim 4, in which the highest-priority replacement policy criterion is a usefulness-based replacement policy criterion depending on a level of usefulness associated with the one or more existing candidate producer-consumer relationships.

6. The apparatus according to claim 2, in which the hierarchy of replacement policy criteria includes a self-producer-based criterion depending on whether a self-producer condition is satisfied for at least one of: the new candidate producer-consumer relationship, and the one or more existing candidate producer-consumer relationships;
  the self-producer condition being satisfied for the given candidate producer-consumer relationship when the given consumer load is itself a producer load for another producer-consumer relationship.

7. The apparatus according to claim 1, in which the replacement control circuitry is configured to:
  allow the new candidate producer-consumer relationship to replace one of said one or more existing candidate producer-consumer relationships having less than a threshold level of usefulness; and
  when none of said one or more existing candidate producer-consumer relationships has less than the threshold level of usefulness and the new candidate producer-consumer relationship satisfies the PD-CO match condition, allow the new candidate producer-consumer relationship to replace one of said one or more existing candidate producer-consumer relationships which fails to satisfy the PD-CO match condition.

8. The apparatus according to claim 1, in which the address operand of the given consumer load is a base address operand indicating a base address from which an address of the given consumer load is to be calculated by adding an offset indicated by an offset operand to the base address.

9. The apparatus according to claim 1, in which the address operand of the given consumer load is an offset operand indicating an offset to be added to a base address to calculate an address of the given consumer load.

10. The apparatus according to claim 1, in which each candidate producer-consumer relationship is indicative of a consumer offset between producer data loaded by a producer load and a consumer target address of a consumer load; and
  the match determining circuitry is configured to determine whether the given candidate producer-consumer relationship satisfies the PD-CO match condition based on a comparison of at least a subset of bits of the consumer offset for the given candidate producer-consumer relationship and an offset operand of the given consumer load indicating an offset to be added to a base address to calculate the consumer target address of the given consumer load.

11. The apparatus according to claim 10, in which the address operand is the base address operand.

12. The apparatus according to claim 10, in which the match determining circuitry is configured to exclude at least one least significant bit of the consumer offset and the offset operand from the subset of bits used for the comparison for determining whether the given candidate producer-consumer relationship satisfies the PD-CB match condition.

13. The apparatus according to claim 10, in which when a magnitude of the offset operand is greater than a threshold value, the match determining circuitry is configured to determine that the given candidate producer-consumer relationship fails to satisfy the PD-CB match condition.

14. The apparatus according to claim 13, in which the match determining circuitry is configured to exclude, from the subset of bits used for the comparison for determining whether the given candidate producer-consumer relationship satisfies the PD-CB match condition, at least one most significant bit of the offset operand which corresponds to a bit position representing a bit with greater magnitude than the threshold value.

15. The apparatus according to claim 1, in which the prefetch generation circuitry is configured to generate the producer prefetch and the consumer prefetch based on producer-consumer relationships indicated in a pattern history table; and
  the training circuitry is configured to promote to the pattern history table a candidate producer-consumer relationship of the training table meeting a promotion condition.

16. The apparatus according to claim 1, in which the new candidate producer-consumer relationship and the one or more existing candidate producer-consumer relationships correspond to the same producer load but different consumer loads.

17. The apparatus according to claim 1, in which the training table comprises a plurality of training entries, each entry specifying a plurality of candidate producer-consumer relationships between a same producer load and two or more different consumer loads.

18. A method comprising:
  updating, based on executed load operations, a training table indicative of a plurality of candidate producer-consumer relationships being trained for use in generating a producer prefetch to request return of producer data and a consumer prefetch to request prefetching of consumer data to a cache, the consumer data having an address derived from the producer data;
  determining, for a given candidate producer-consumer relationship between a given producer load and a given consumer load, whether the given candidate producer-consumer relationship satisfies a producer-data-consumer-operand (PD-CO) match condition indicative of the producer data of the given producer load matching an address operand of the given consumer load; and
  controlling, based on at least one replacement policy criterion, replacement of an existing candidate producer-consumer relationship indicated in the training table with a new candidate producer-consumer relationship; in which:
  said at least one replacement policy criterion includes a PD-CO-match-based replacement policy criterion depending on whether the PD-CO match condition is satisfied for at least one of: the new candidate producer-consumer relationship, and one or more existing candidate producer-consumer relationships capable of being replaced with the new candidate producer-consumer relationship.

19. A non-transitory computer-readable medium to store computer-readable code for fabrication of an apparatus comprising:
- prefetch generation circuitry to generate requests to prefetch data to a cache, where the prefetch generation circuitry is configured to initiate a producer prefetch to request return of producer data having a producer address and to initiate at least one consumer prefetch to request prefetching of consumer data to the cache, the consumer data having an address derived from the producer data returned in response to the producer prefetch;
- training circuitry to update, based on executed load operations, a training table indicative of a plurality of candidate producer-consumer relationships being trained for use by the prefetch generation circuitry in generating the producer prefetch and the consumer prefetch;
- match determining circuitry to determine, for a given candidate producer-consumer relationship between a given producer load and a given consumer load, whether the given candidate producer-consumer relationship satisfies a producer-data-consumer-operand (PD-CO) match condition indicative of the producer data of the given producer load matching an address operand of the given consumer load; and
- replacement control circuitry to control, based on at least one replacement policy criterion, replacement of an existing candidate producer-consumer relationship indicated in the training table with a new candidate producer-consumer relationship; in which:
- said at least one replacement policy criterion includes a PD-CO-match-based replacement policy criterion depending on whether the PD-CO match condition is satisfied for at least one of: the new candidate producer-consumer relationship, and one or more existing candidate producer-consumer relationships capable of being replaced with the new candidate producer-consumer relationship.

* * * * *